US007085818B2

(12) United States Patent
Brown et al.

(10) Patent No.: US 7,085,818 B2
(45) Date of Patent: Aug. 1, 2006

(54) METHOD, SYSTEM, AND PROGRAM FOR PROVIDING INFORMATION ON PROXIMATE EVENTS BASED ON CURRENT LOCATION AND USER AVAILABILITY

(75) Inventors: Michael Wayne Brown, Georgetown, TX (US); Rabindranath Dutta, Austin, TX (US); Michael A. Paolini, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 630 days.

(21) Appl. No.: 09/965,007

(22) Filed: Sep. 27, 2001

(65) Prior Publication Data

US 2003/0061303 A1 Mar. 27, 2003

(51) Int. Cl.
*G06F 15/16* (2006.01)

(52) U.S. Cl. ...................................... 709/217

(58) Field of Classification Search ........ 701/300–302, 701/207–215; 340/426.19–426.22; 342/357.06–357.15; 370/328–338; 709/200–203, 217–219
See application file for complete search history.

(56) References Cited

U.S. PATENT DOCUMENTS

| 5,124,912 | A | | 6/1992 | Hotaling et al. | |
|---|---|---|---|---|---|
| 5,416,473 | A | | 5/1995 | Dulaney, III | |
| 5,428,784 | A | * | 6/1995 | Cahill, Jr. ................. | 709/206 |
| 5,664,063 | A | | 9/1997 | Johnson et al. | |
| 5,664,175 | A | | 9/1997 | Jackson et al. | |
| 5,774,873 | A | | 6/1998 | Berent et al. | |
| 5,790,974 | A | | 8/1998 | Tognazzini | |
| 5,832,489 | A | | 11/1998 | Kucala | |
| 5,835,896 | A | | 11/1998 | Fisher et al. | |
| 5,890,138 | A | | 3/1999 | Godin et al. | |
| 5,918,158 | A | | 6/1999 | LaPorta et al. | |
| 5,978,770 | A | * | 11/1999 | Waytena et al. ............. | 705/5 |
| 6,047,260 | A | | 4/2000 | Levinson | |
| 6,085,166 | A | | 7/2000 | Beckhardt et al. | |
| 6,101,480 | A | | 8/2000 | Conmy et al. | |
| 6,154,172 | A | | 11/2000 | Piccionelli et al. | |
| 2002/0047861 | A1 | * | 4/2002 | LaBrie et al. ............. | 345/733 |
| 2002/0174003 | A1 | * | 11/2002 | Redmann et al. ........... | 705/8 |
| 2003/0061094 | A1 | * | 3/2003 | Banerjee et al. ............ | 705/14 |
| 2003/0212996 | A1 | * | 11/2003 | Wolzien ..................... | 725/60 |

FOREIGN PATENT DOCUMENTS

| EP | 0495622 | 1/1992 |
|---|---|---|
| EP | 0637807 | 7/1994 |
| EP | 0834840 | 9/1997 |

(Continued)

OTHER PUBLICATIONS

Simulatation applied to Theme Park Management, Mielke, R., et. al., Proceedings of the 1998 Winter Simulation Conference, p. 1199-1203.*

(Continued)

*Primary Examiner*—Beatriz Prieto
(74) *Attorney, Agent, or Firm*—David W. Victor; Konrad Raynes & Victor, LLP

(57) ABSTRACT

Provided is a method, system, and program for transmitting information to a wireless device. A determination is made of a current location of the wireless device and whether the current location is within a proximity to a target location. If the current location is within the proximity to the target location, then information is transmitted to the wireless device on offerings available at the target location.

48 Claims, 17 Drawing Sheets

FOREIGN PATENT DOCUMENTS

| EP | 1039397 | 9/2000 |
|---|---|---|
| WO | 0029979 | 5/2000 |

OTHER PUBLICATIONS

Military Networking Technology Applied to Location-based, Theme Park & Home Entertainment Systems, Katz, W., et. al. ACM SIGGRAPH Computer Graphics archive, vol. 28 , Issue 2 (May 1994) ISSN: 0097-8930, p. 110-112.*

Patent Cooperation Treaty (PCT) International Search Report, Jan. 29, 2003, for International Application No. PCT/GB02/02020.

Beadle, H.W., et al. "*Using Location and Environment Awareness in Mobile Communications.*" International Conference on Information, Communications and Signal Processing. ICICS. Singapore Sep. 9-12, 1997, pp. 1781-1785. New York, NY, USA, IEEE.

Manandhar, Sanjay. "*Activity Server: You Can Run but You Can't Hide.*" Proceedings of the Summer Usenix Conference Proceedings, pp. 299-311, Jun. 10-14, 1991, Nashville, TN, US (1991) Berkeley, CA, US.

Want, R. et al. "*The Active Badge Location System.*" ACM Transactions on Information Systems 10 (1992), pp. 91-102, Jan., No. 1, New York, US.

Hancock, Bill. "*Wireless Big Brother.*" Computers and Security. International Journal Devoted to the Study of Technical and Financial Aspects of Computer Security, Elsevier Science Publishers, vol. 19, No. 8, Dec. 1, 2000, pp. 667-668. Amsterdam, NL.

Rhodes, Bradley J. "*The Wearable Remembrance Agent: a System for Augmented Memory.*" Wearable Computers, 1997. Digest of Papers. First International Symposium on Cambridge, MA, USA, pp. 123-128.

U.S. Appl. No. 09/848,166, filed on May 3, 2001, entitled "Method System and Program for Providing User Location Information with a Personal Information Management Program," by MW Brown; R Dutta and MA Paolini.

U.S. Appl. No. 09/848,176, filed on May 3, 2001, entitled "Method, System and Program for Mining Data in a Personal Information Manager Database," by MW Brown; R Dutta and MA Paolini.

U.S. Appl. No. 09/848,173, filed on May 3, 2001, entitled "Method, System and Program for Providing User Location Information for a Personal Information Management System from Transmitting Devices," by MW Brown; R Dutta and MA Paolini.

U.S. Appl. No. 09/888,471, filed on Jun. 25, 2001, entitled "Method, System and Program for Accessing Calendar Information for Shadowed Users from a Database," by RW Bassett; MW Brown; R Dutta and MA Paolini.

U.S. Appl. No. 09/895,244, filed on Jun. 29, 2001, entitled "Method, System and Program Implementing an Auction Using Calendar Information," by MW Brown; R Dutta and MA Paolini.

Mueller, Erik T., "A Calendar with Common Sense", © 2000 ACM, pp. 198-201.

Schwartz, Ephraim, "Cellular Phone Giants to Integrate Sirf's GPS Technology", Aug. 10, 1998 [online], Retrieved from the Internet <URL: www.infoworld.com./cgi-bin/displayStory.pl?980810.ehe911.htm>.

"allNetDevices:—The Wireless Internet: Applications, Technology and Market Strategies", Jan. 10, 2001, pp. 1-4 [online]. Retrieved from the Internet <URL: www.allnetdevices.com/icom_cgi/print/print.cgi?url=http://www.allnetdevices.com/wireless/opinions/2001 . . . >.

"allNet Devices:—Java 2 Micro Edition and the Mobile Information Device Profile", Feb. 16, 2001, pp. 1-7 [online]. Retrieved from the internet <URL: www.allnetdevices.com/icom_cgi/print/print.cgi?url=http://www.allnetdevices.com/developer/tutorials/2001 . . . >.

Software Patent Institute Database of Software Technologies, Record Display, Record 4, Ser. No. TDB1192.0038. Retrieved from the Internet <URL: http://m.spi.org/cgi-bin/newqry?ISA=Hit . . . 000&rec=4&submit=seeit&csum=17256401631>.

Software Patent Institute Database of Software Technologies, Record Display, Record 6, Ser. No. TDB1192.0045. Retrieved from the Internet <URL: http://m.spi.org/cgi-bin/newqry?ISA=Hit . . . 000&rec=4&submit=seeit&csum=17950330939>.

"allNetDevices:—Wearable Transmeta Device Planned", Nov. 14, 2000 [online]. Retrieved from the Internet <URL: www.allnetdevices.com/icom_cgi/print/print.cgi?url=http://www.allnetdevices.com/wireless/news/2001 . . . >.

"allNetDevices:—Any Content, Any Device, Anyplace", Feb. 16, 2001 [online]. Retrieved from the Internet <URL: www.allnetdevices.com/icom_cgi/print/print.cgi?url=http://www.allnetdevices.com/wireless/news/2001 . . . >.

Patent Cooperation Treaty (PCT) International Search Report, for International Application No. PCT/GB 02/02051, Search completed on May 9, 2003.

* cited by examiner

Scheduled Event Record

Measured Position Record

Location Record

Filtered Position Record

FIG. 8

| Time | Scheduled Event | Actual Activity |
|---|---|---|
| 8:00 AM | Arrive at Work | At Home |
| 9:00 | Work at desk | In office |
| 10:00 | | |
| 11:00 | | |
| 12:00 | Lunch at Dennys | In office |
| 1:00 | Meeting w/ office team | In meeting room |
| 2:00 | | In office |
| 3:00 | | In office |
| 4:00 | | In office |
| 5:00 | Family Dinner | In office |

Calendar — February 5, 2001

Monday, February 5th

May 2005
| S | M | T | W | T | F | S |
|---|---|---|---|---|---|---|
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | | | | |

March 2005
| S | M | T | W | T | F | S |
|---|---|---|---|---|---|---|
| | | 1 | 2 | 3 | 4 | 5 |
| 6 | 7 | 8 | 9 | 10 | 11 | 12 |
| 13 | 14 | 15 | 16 | 17 | 18 | 19 |
| 20 | 21 | 22 | 23 | 24 | 25 | 26 |
| 27 | 28 | 29 | 30 | 31 | | |

Visitor Record

Visited Event Record

US 7,085,818 B2

METHOD, SYSTEM, AND PROGRAM FOR PROVIDING INFORMATION ON PROXIMATE EVENTS BASED ON CURRENT LOCATION AND USER AVAILABILITY

RELATED APPLICATIONS

This application is related to the following copending and commonly assigned patent applications, which are incorporated herein by reference in their entirety:

"Method, System, and Program for Providing User Location Information with a Personal Information Management Program", having U.S. patent application Ser. No. 09/848,166 filed on May 3, 2001;

"Method, System, and Program for Providing User Location Information for a Personal Information Management System from Transmitting Devices", having U.S. patent application Ser. No. 09/848,173 filed on May 3, 2001;

"Method, System, and Program for Mining Data in a Personal Information Manager Database", having U.S. patent application Ser. No. 09/848,176 filed on May 3, 2001; and "Method, System, and Program for Accessing Calendar Information for Shadowed Users from a Database", Ser. No. 09/888,471.

BACKGROUND OF THE INVENTION

1. Field of the Invention

The present invention relates to a method, system, and program for providing information on proximate events.

2. Description of the Related Art

Portable computing devices, such as hand held computers, cellular phones, palm devices, etc., have become increasingly popular in recent years. The technology has advanced to such a degree that now people can access the Internet through wireless technology, such as a cellular phone or personal digital assistant (PDA), and review content especially tailored for a small portable device. The term PDA, as used herein, refers to any wireless, portable, and small hand held computer device, such as a palm computer, cellular phone, wearable computers, etc. Some of the most popular mobile applications for such wireless devices have included personal information managers (PIMs), entertainment programs, financial services, and mobile commerce.

One of the recent technological developments for mobile Internet access is the Wireless Application Protocol (WAP), which allows mobile devices to use data services and access the Internet. WAP provides a client/server architecture. A WAP enabled client, such as a cell phone or palm computer, can use micro browsers which are designed to operate within the small display screen of mobile devices and use less memory than a desktop browser. Content for mobile WAP enabled devices may be written in the Wireless Markup Language (WML), which provides a tagged mark-up language similar to the hypertext markup language (HTML), but designed specifically to function in a small-screen environment. Many content providers are providing WAP pages to enable access to the large base of mobile phone and PDA users.

Notwithstanding, recent developments in wireless computing, such as more advanced PIMs, Internet browsing and e-commerce features, only provide users with a significantly limited version of the programs and functions that are available at a desktop computer. For instance, a desktop PIM or calendar program provides a substantially more robust display presentation and range of program functionality than is available for mobile wireless device PIM applications. The same is true for Internet browsing. Given the substantial advantages of desktop PIM and Internet access programs over those available for mobile devices, most computer users, except the submarket of frequent business travelers, may not be motivated to purchase wireless devices for uses other than as a mobile telephone and limited PIM, e.g., address book, calendar, to do list, etc.

Thus, there is a need in the art for an application that would more fully exploit wireless computing technology to extend the utility beyond that of a portable telephone and limited PIM.

SUMMARY OF THE PREFERRED EMBODIMENTS

Provided is a method, system, and program for transmitting information to a wireless device. A determination is made of a current location of the wireless device and whether the current location is within a proximity to a target location. If the current location is within the proximity to the target location, then information is transmitted to the wireless device on offerings available at the target location.

In further implementations, accessing scheduled event records are accessed for a user of the wireless device, wherein each scheduled event record indicates one event scheduled for a calendar time period. The scheduled event records for the user are processed to determine whether the user is available to visit the target location, wherein the information is not transmitted if the user is not determined to be available to visit the target location.

Further provided is a method, system, and program for transmitting information to a wireless device. A determination is made of a current location of the wireless device. A data structure is provided including event information for each of a plurality of events that occur at an event location. A determination is then made as to whether the current location is within a proximity to at least one of the event locations. If the current location is within the proximity to at least one event location, then event information is transmitted to the wireless device for the at least one event whose event location is within the proximity to the wireless device.

Still further provided is a method, system, and program for processing information at a wireless device. Information broadcasted within a defined region on event offerings at a target location for an event time period is received. Scheduled event records for a user of the wireless device are accessed, wherein each scheduled event record indicates one event scheduled for a calendar time period. The scheduled event records for the user are processed to determine whether the user is available during the event time period. The information is presented to the user if the user is determined to be available during the event time period.

In yet further implementations, a method, system, and program is provided for processing information at a wireless device. Transmission of event information for a plurality of events that occur at event locations is received. A list of user selected events is provided and a determination is made as to whether the event information is for one event on the list of user selected events. The received event information for each event that is determined to be on the list of user selected events is then presented.

The described implementation provides a technique for using a wireless device to provide information users of the of the wireless device of information on events, such as service and product offerings, within a predefined proximity to the wireless device. This information is provided to inform the user of the wireless device of offerings and events that are occurring at a location where the user of the wireless device is visiting.

BRIEF DESCRIPTION OF THE DRAWINGS

Referring now to the drawings in which like reference numbers represents corresponding parts throughout:

FIGS. 8, 9a, and 9b illustrate examples of a display of user calendar and generated location information in accordance with implementations of the present invention;

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
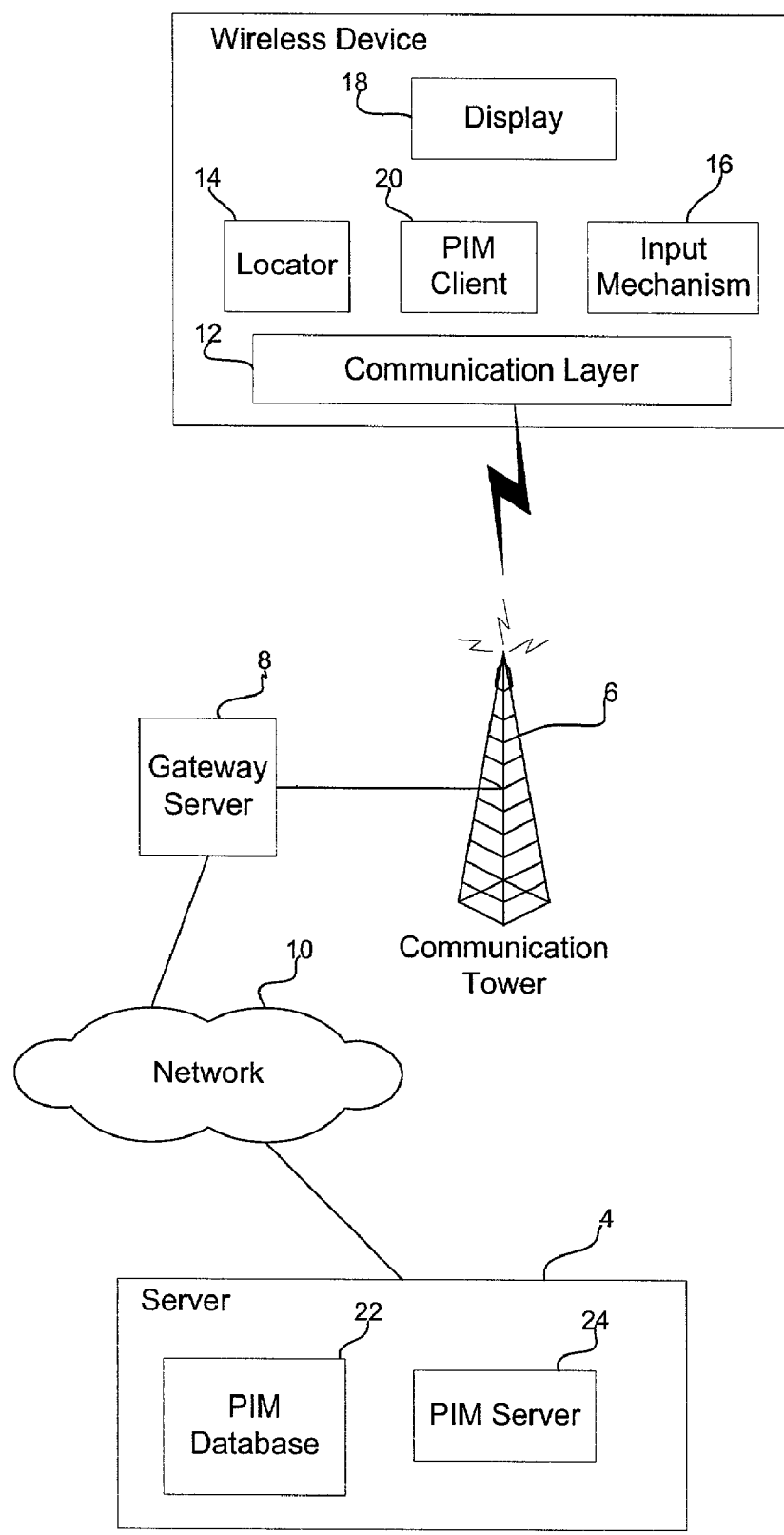
FIG. 1 illustrates a telecommunication environment in which aspects of the invention are implemented.

FIG. 1 illustrates a wireless computing environment in which embodiments of the invention are implemented. A wireless device 2, such as a telephony device, e.g., cellular phone, personal digital assistant (PDA), hand held computer, palm computer, etc., communicates with a server 4 via a communication tower 6, gateway server 8, and network 10. The server 4 may comprise one or more server class machines known in the art. The wireless device 2 includes a communication layer 12 which converts digital data into a signal that is transmitted to the communication tower 6 in a manner known in the art. The gateway server 8 converts the signals back into digital data to transmit via network 10 to the server 4. The network 10 may comprise any collection of devices, routers, etc. used to transmit data to a centralized server 4 providing data management for the wireless device 2 operations. The communication tower 6 and communication layer 12 may implement any known wireless transmission technology known in the art, such as 3G, Code-Division Multiple Access (CDMA), Global System for Mobile Communications (GSM), satellite, Bluetooth, etc.**

The wireless device 2 further includes locator technology 14 that provides a current position coordinate of the wireless device 2 in three dimensional space (x, y, z) on the surface of the earth and the time the position coordinate was generated. The locator 14 may comprise a global position satellite (GPS) receiver that is capable of calculating a current position based upon signals sent from satellites in a manner known in the art. Alternatively, the location of the wireless device 2 can be estimated externally from the wireless device by measuring the transmissions from the wireless device 2 using any known location positioning technology in a manner known in the art, such as Enhanced Observed Time Differential (E-OTD), Time Of Arrival (TOA), the CellPoint positioning system, the Ericsson Mobile Positioning System, etc.** In fact the United States Federal Communication Commission (FCC) mandated that cellular phone manufacturers incorporate technology to allow the location of the wireless device 2 to be determined. Any reference to the locator 14 refers to the locator technology used within the wireless device 2 that enables a position determination. For instance, if the locator 14 comprises a GPS receiver, then the locator 14 itself may determine the actual position coordinate. Alternatively, the locator 14 may provide information to an external component to enable the external component to determine the position coordinate of the wireless device 2.

The wireless device 2 further includes an input mechanism 16 for entering any type of data, including text, voice data, audio, images, movies, etc. The input mechanism 16 may include any known data input system known in the art, including a keyboard embedded in the device 2 with depressable keys, a touch sensitive displayed keyboard, a microphone for providing audio input, voice recognition software, still image camera, video recorder, pen-stylus text input system including handwriting recognition software, etc. Data entered by the user through the input mechanism 16 or downloaded from the server 4 can be rendered in display 18, which may comprise any electronic display device known in the art. A Personal Information Manager (PIM) client 20 gathers and presents PIM information, such as calendering and scheduling information, in accordance with the described implementations. The term "PIM" as used herein refers to a program designed to allow users to organize random bits of information in a useful format. The PIM program may enable calendar or scheduler operations. A calendar program enables one or more users to record and organize events and appointments. A scheduler program enables a group of colleagues to schedule meetings and other appointments, and share schedule and calendar information. Further, the PIM may be intended for use by a single individual for personal information or for use by a company or organization to provide information related to that persons involvement with the company or organization. The use of the term PIM or PIM program herein refers to any program that includes some or all of the above described calendar or scheduler functions, or any other functions those skilled in the art associate with PIMs.

The server 4 includes a PIM database 22 maintaining user PIM information and a PIM server 24 for gathering and filtering data from wireless devices 2 for the users of the system. The PIM database 22 may be implemented using any database technology known in the art, e.g., relational database, object oriented database, etc. Although FIG. 1 only shows one wireless devices 2, the server 4 and PIM database 22 may maintain data for multiple wireless devices 2 and users.

In the described implementations, the PIM client 20 gathers position coordinates for the PIM server 24. The PIM server 24 then uses the position coordinates to supplement the user calendar records with information on what the user actually did for time periods within a day. The user could then view this enhanced calender including listings of scheduled appointments as well as information describing the actual location and activities of the user and descriptions thereof. The term "location" and "geographic location" as used herein refer to any location that may be mapped and ascertained. Such location or geographic location may be any location on the surface of the earth or the earth's atmosphere, or outer space, that can be expressed as a position coordinate in space. The term "location" or "geographic location" may refer to a specific position coordinate in space, e.g., an X, Y, Z coordinate, or a boundary or area of coordinates. Additionally, the location may be expressed as a vector. The term "position coordinate" as used herein refers to any of a set of numbers used in specifying the location of a point in space, or any one of a set of variables used in specifying the state or motion of an entity, such as a wireless unit or person, associated with the position coordinate.

The PIM server 24 includes the program logic that responds to data requests from PIM clients 20, accesses the PIM database 22 to perform database operations, and performs other data management operations related to managing the PIM database 22. The PIM server 24 may include a database management system (DBMS) known in the art or include an interface to access a DBMS program in a manner known in the art to perform operations with respect to the PIM database 22. The PIM server 24 may implement any database programming techniques for performing operations in the PIM database 22. For instance, the PIM server 24 may implement separate application programs for performing database operations or implement database stored procedures to perform database operations. The PIM client 20 includes those program components that gather coordinate and location information as described herein, communicates with the PIM server 24, and renders calendaring information at the wireless device 2.

Figure 2:
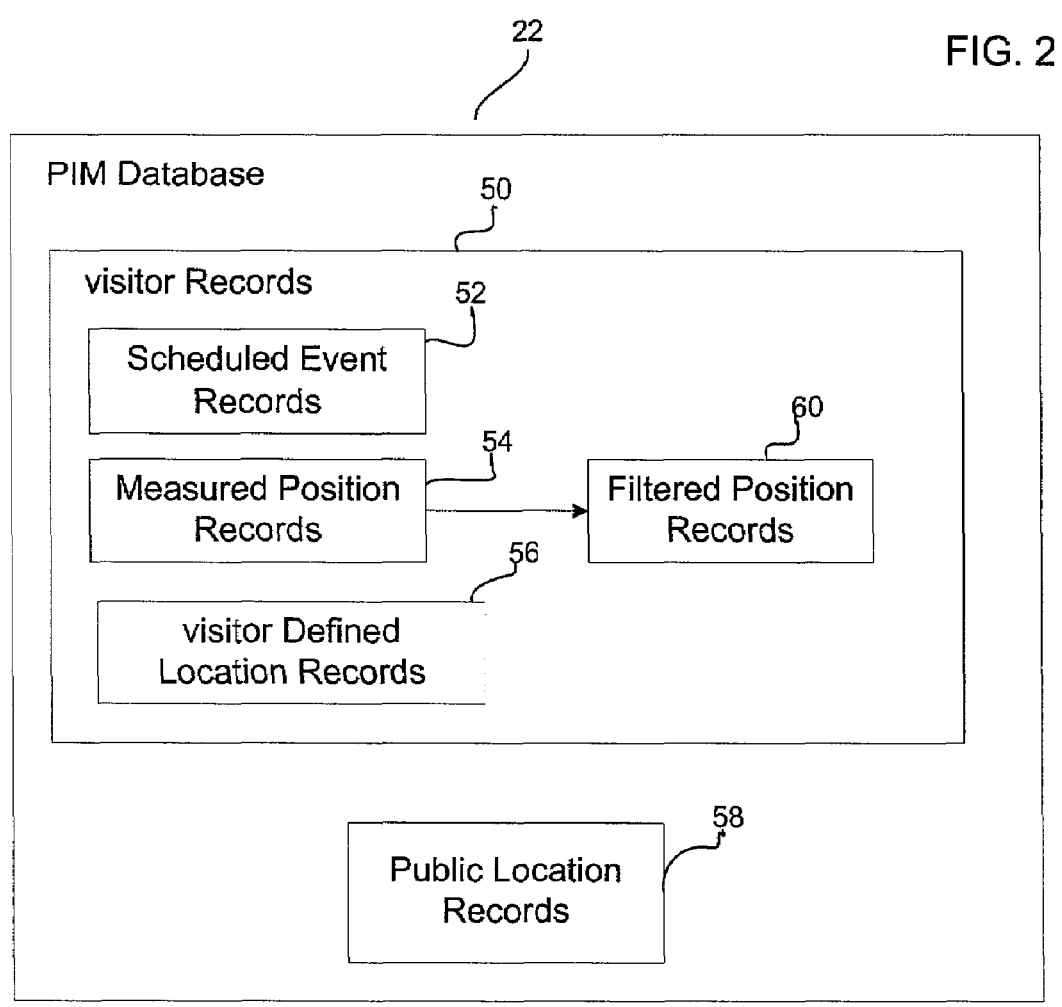
FIG. 2 illustrates components of a PIM database in accordance with implementations of the present invention.

FIG. 2 illustrates the data components of the PIM database 22 maintained by the server 4. The PIM database 22 includes a plurality of user records 50 for each user of a wireless device 2 participating in the wireless computing environment described herein. Each user record 50 includes one or more user scheduled event records 52, measured position records 54, and location records 56 and 58. From the measured position records 54, the PIM server 24 generates filtered position records 60 that provide information on user geographic location and activity for time periods, such as information for a period of fifteen minutes, twenty minutes, one hour, etc.

Figure 3A:
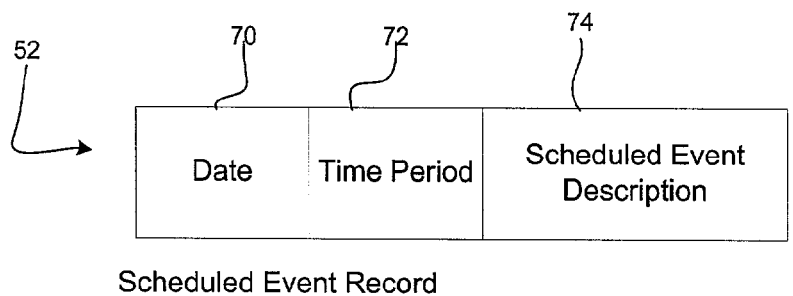
FIGS. 3a, b, c, d illustrate data structures used in accordance with implementations of the present invention.

FIG. 3a illustrates fields in a user scheduled event record 52, including a date 70, time period 72 indicating a time range of the event, and a scheduled event description 74 providing information on the nature of the scheduled event. Through the client PIM 20 software, a user could use the input mechanism 16 to schedule a calendar event and create a scheduled event record 52. Additionally, the user could enter scheduled events from a desktop computer (not shown) that communicates with the server 4 via a network such as the Internet. The scheduled events may be shown in a calendar rendered on the display 18. Additionally, the scheduled events may be shown in a calendar rendered on another computer capable of accessing the server user records 50 in the server 4, such as a desktop computer communicating with the server 4 over the Internet.

Figure 3B:
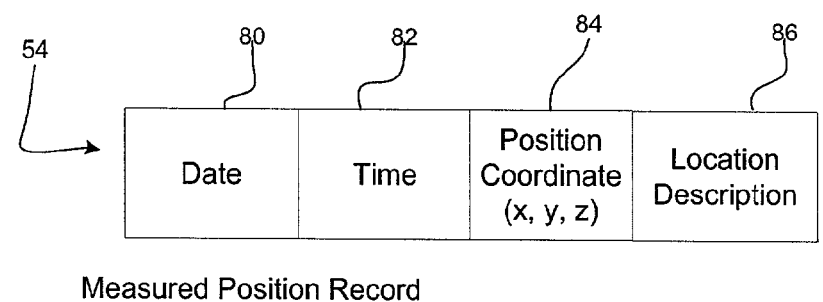

FIG. 3b illustrates fields in a measured positioned record 54 for a user, including a date 80 and time 82 the position was measured, a position coordinate 84 expressed as a unique three dimensional x, y, z geographic coordinate on the surface of the earth, and a location description 86 providing descriptive information on the location. In the described implementations, the PIM client 20 periodically generates a measured position record 54 by obtaining the measured position coordinate (x, y, z) and the current time from the locator 14 (which may, in certain implementation interact with external components to provide the location and position coordinate). The location description 86 may be obtained locally at the wireless device 2 or determined subsequently by the server 4 as described in the following implementations.

Figure 3C:
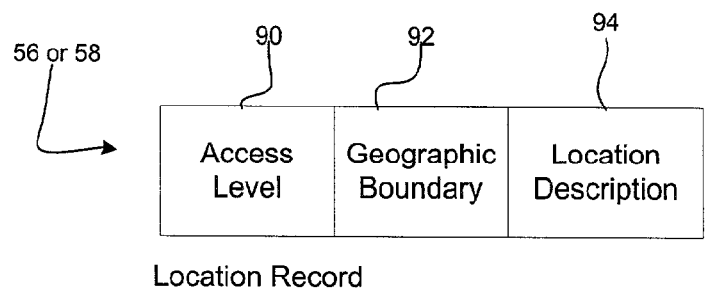

FIG. 3c illustrates the fields maintained in the user defined 56 and public 58 location records. An access level field 90 indicates which users can be allowed to use the location record 56 or 58 to determine information about a location. The public location record 58 has public level access such that the PIM server 24 can consider a public location record 58 for any user in the PIM database 22. A user location record 56 can only be considered for the particular user that defined the location record 58 and any other authorized users in the system, as indicated by the access level 90. A geographic boundary field 92 defines a boundary of a defined region in three dimensional space. A location description field 94 provides a description of the location, which may include text, images, sound, movies, etc. A company maintaining the server 4, such as a telecommunication service provider, can use satellite maps and other information to determine the geographic boundaries in three dimensional space of various buildings and businesses. Business could register their geographic boundaries. Public location records 58 may then be generated for each of these determined geographic boundaries and include a description of the location within the geographic boundary.

The user specified location records 56 are generated by the user to provide information to include with the user's calendar. For instance, the user may obtain from a third party, such as a mapping company or organization, the geographic boundaries of an office or building and provide geographic boundary and location description information to the server 4 to include in a user location record 56. In another implementation, the user can activate a geographic boundary definition mode on the wireless device 2 to record position coordinates of a geographic boundary using the locator 14. In this geographic boundary definition mode, the user may walk or otherwise travel around a geographic area. While moving through the geographic area, the wireless device 2 would determine the x, y, z position coordinates at frequent intervals using the locator 14. The PIM client 20 or PIM server 24 can then use the determined position coordinates to determine a geographic boundary bounding all of the coordinates generated in the geographic boundary definition mode. This determined geographic boundary would then be included in the geographic boundary field 92 of the eventual user defined location record 56 stored in the user records 50 in the database 22. The user may further use the input mechanism 16 to enter information to include in the location description field 94 and the access level 90. The user access level 90 may specify that the user location record 56 be accessible to the user and other specified users, thereby limiting access of the location record 56 to a user defined group.

Figure 3D:
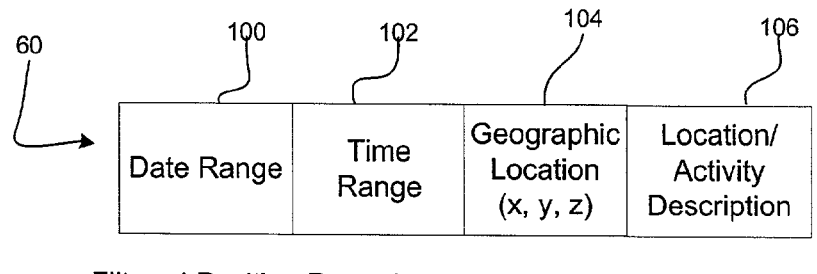

FIG. 3d illustrates a filtered position record 60 generated from a range of consecutive measured position records 54 having a same location description 86. The date range 100 and time range 102 for the generated filtered position record 60 would comprise the first and last dates 80 and times 82 of the consecutive position records 54 having the same location description 86. In this way, a single filtered position record 60 represents the data in multiple consecutive position records 54 having a same location description 106. Alternatively, a filtered position record 60 can consolidate multiple position records 54 that have position coordinates 84 within a predetermined proximity, without consideration of the location description 86. A geographic location field 104 indicates the common geographic location of the position records 60 having the same location description 86, which could include the geographic boundary from a location record 56 or 58 if the location description 86 of the consolidated position records 60 was determined from a location record 56 or 58.

Additionally, if algorithms in the PIM server 24 determine that a range of measured position records 54 define an activity, e.g., driving, walking, flying in an airplane, etc., then a filtered position record 60 would be generated for those position records 54 defining the activity. The date range 100 and time range 102 for the generated filtered position record 60 would comprise the first and last date 80 and time 82 of the consecutive position records 64 defining an activity and the location/activity description 106 field for this filtered position record 60 would include a description of the determined activity.

Figure 4:
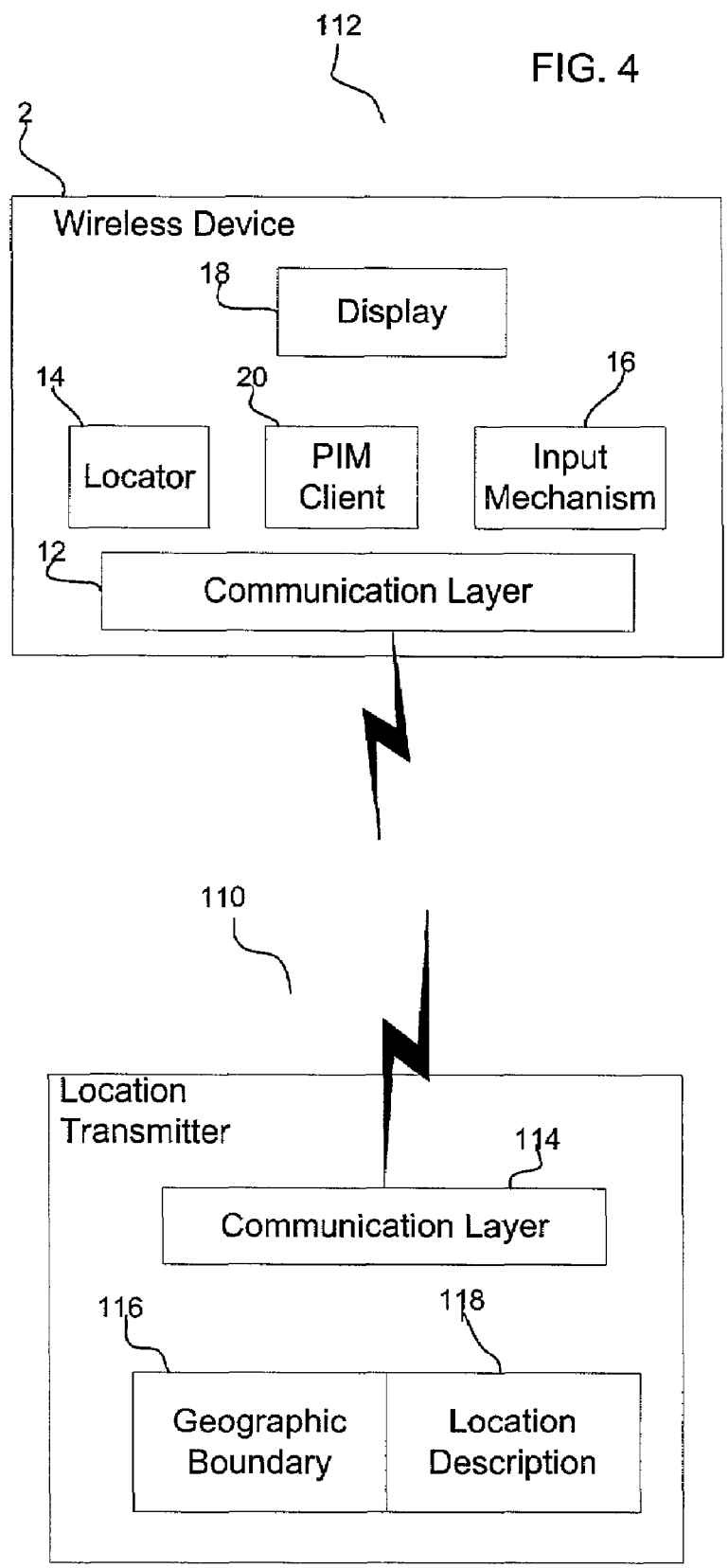
FIG. 4 illustrates further details of the telecommunication environment in which aspects of the invention are implemented.

FIG. 4 illustrates an additional implementation of the telecommunication environment for obtaining geographic boundary information. A location transmitter 110 is maintained in a geographic location or boundary 112, such as an office, building, designated region, etc., and includes a communication layer 114 to transmit data throughout the geographic location 112. For larger geographic locations, multiple location transmitters 110 may be deployed to transmit throughout the entire geographic location 112. The location transmitter 110 maintains a geographical boundary 116, defining a region of x, y, z coordinates, and a location description 118 providing descriptive information on the geographic boundary 112. The local transmitter 110 is capable of transmitting the geographic boundary 116 and location description 118 through the communication layer 114 to any receiving device within the geographic boundary 102. For instance, the communication layers 12 and 114 of the wireless device 2 and location transmitter 110, respectively, may implement Bluetooth technology. In such Bluetooth implementations, the location transmitter 110 may continually transmit packets containing an Inquiry Access Code (IAC) to establish communication with any wireless devices 2 within the geographic boundary 112. The wireless device 2 may then respond to establish a connection with the local transmitter 110. Upon establishing the connection, the local transmitter 110 may then transmit the geographic boundary 116 and location description 118 through communication layer 114 to the communication layer 12 of the wireless device 2. Further details of Bluetooth communication technology are described in the publication "Bluetooth (™): Connect Without Cables" by Jennifer Bray and Charles F. Sturman (Copyright 2001, Prentice Hall), which publication is incorporated herein by reference in its entirety. In alternative implementations, the communication layers 12 and 114 may utilize wireless communication protocols other than Bluetooth known in the art to perform the communication operations described herein, such as the wireless LAN architecture standard proposed in IEEE 802.11.

Figure 5:
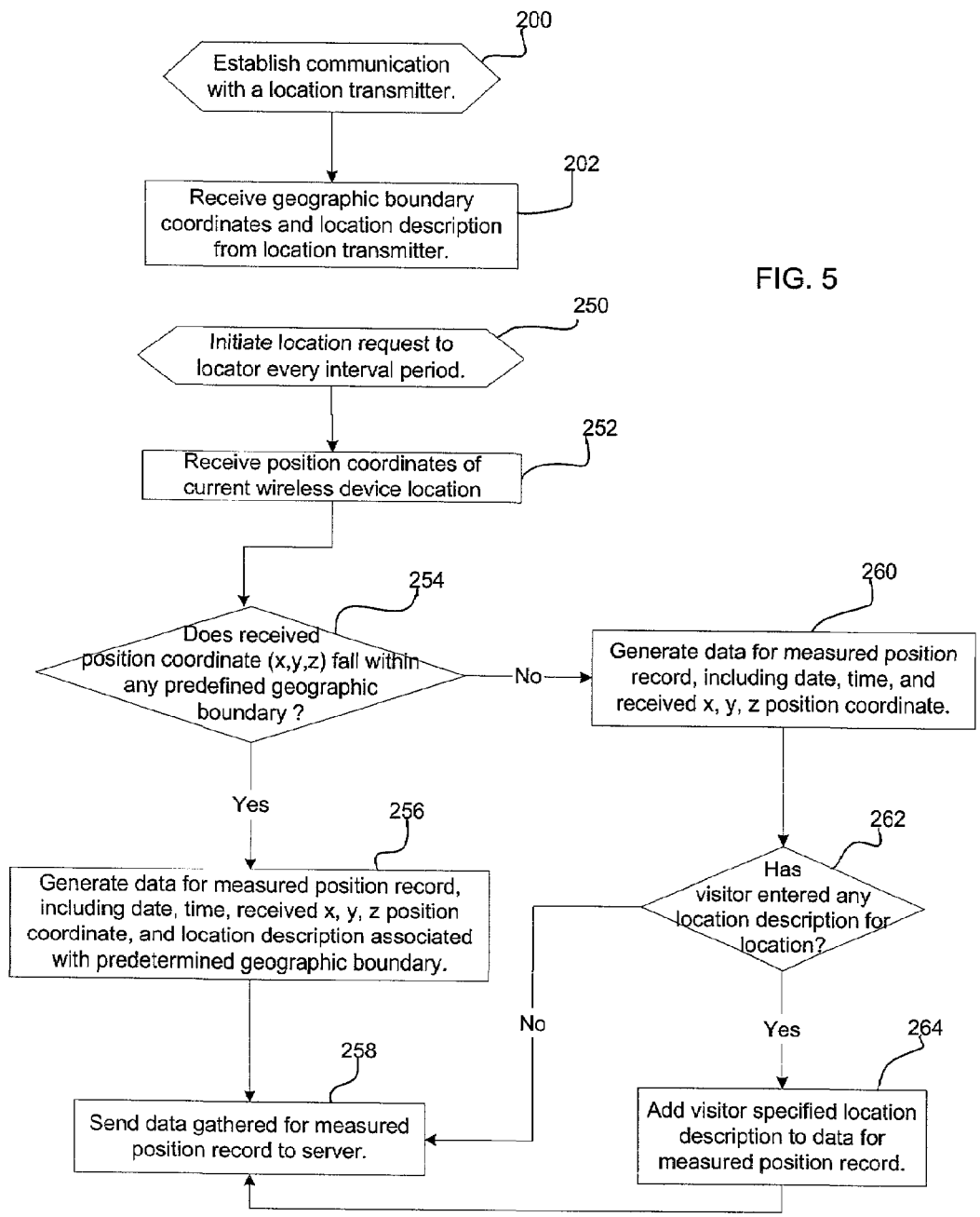
FIGS. 5, 6, and 7 illustrate flowcharts of code logic to gather, process, and use location information in accordance with implementations of the present invention.
Figure 6:
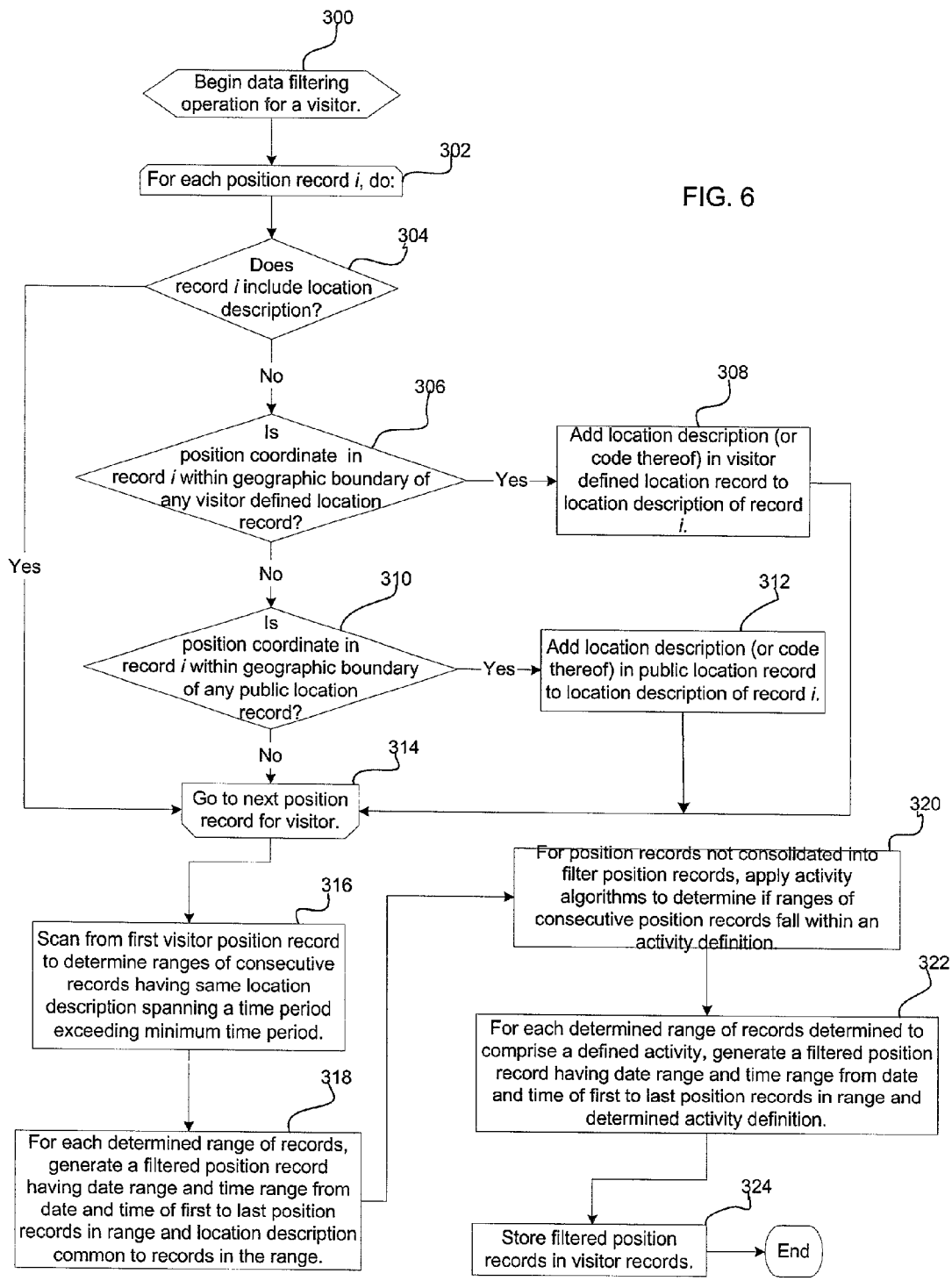
Figure 7:
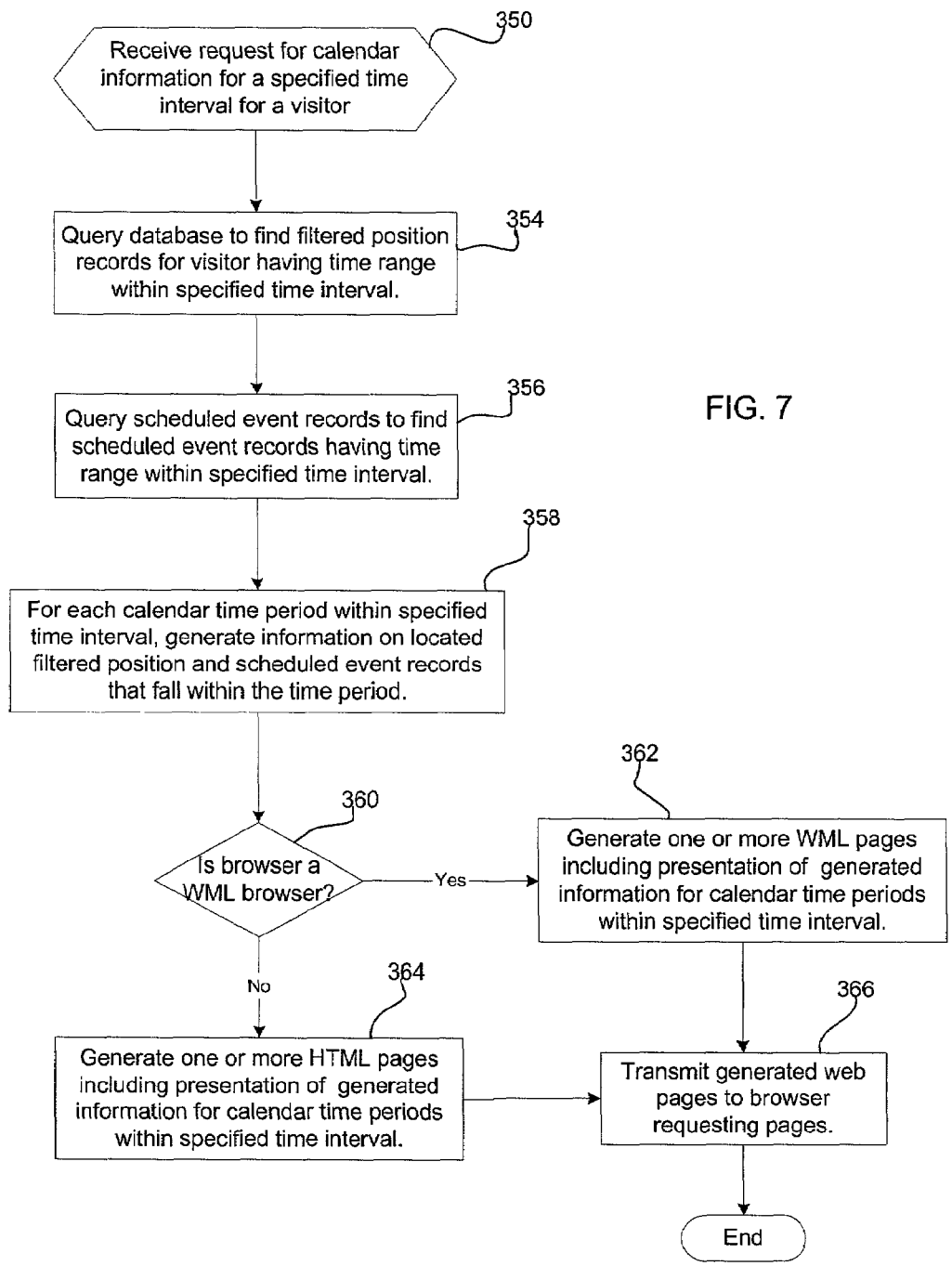

FIGS. 5–7 illustrate logic implemented in the PIM client 20 and server 24 to gather and utilize position information concerning the wireless device 2. FIG. 5 illustrates logic implemented in the PIM client 20 to gather position information to provide to the PIM server 24 to include within measured position records 54 in the database 22. At block 200, the wireless device 2 establishes communication with a location transmitter 110, using the Bluetooth technology or other wireless technology known in the art. After establishing a connection with the location transmitter 110, the PIM client receives (at block 202) a geographic boundary 116 comprised of X, Y, Z coordinates defining a three dimensional boundary on earth and location information describing the geographic boundary 116.

To provide data to the PIM server 24, the PIM client 20 performs steps 250 through 264 in interval time periods, e.g., every few seconds, minute, etc., to measure the current location and generate measured position records 54. At block 250, the PIM client 20 initiates a location request to the locator 14 or other unit to determine the current position coordinate (x, y, z) of the wireless device 2. Upon receiving (at block 252) the position coordinate from the locator 14, the PIM client 20 determines (at block 254) whether the received position coordinate falls within any predefined geographic boundaries supplied by a location transmitter 110, the PIM server 24, a user defined location record 56, or any other geographical boundary maintained by the PIM client 20. If so, the PIM client 20 generates (at block 256) data for a measured position record 54, including the received position coordinate, the date and time the coordinate was determined, and any location description associated with the predefined geographic boundary including the received position coordinate. The gathered data is then sent (at block 258) to the PIM server 24 to include as a position record 54 in the user records 50.

If (at block 254) the received position coordinate did not fall within any predefined geographic boundary, then the PIM client 20 generates (at block 260) data for a measured position record 54 including the received X, Y, Z position coordinate and the date and time the coordinate was measured. If (at block 262) the user has entered through the input mechanism 16 any location description for the current location through the input mechanism 16, then the PIM client 20 adds (at block 264) the user specified location description to the data for the measured position record. From block 264 or the no branch of block 262, the PIM client 20 transmits the data for the measured position record 54 to the PIM server 24 to include in the user records 50.

FIG. 5 provides logic implemented in the PIM client 20 to gather the position records for each measured coordinate. FIG. 6 illustrates logic for a filtering algorithm that consolidates and interprets the measured position records 54 and generates filtered position records 60 that provide information on the user's whereabouts and activities for time periods. The filtering algorithms used to generate the filtered position records 60 may be implemented in either the PIM client 20 or PIM server 24. In the event that the PIM client 20 executes the filtering algorithm, then the PIM client 20 would transmit the filtered position records 60 to the PIM server 54 to store in the PIM database 22.

With respect to FIG. 6, control begins at block 300 with the invocation of the filtering algorithm for the user records 50 of a particular user. A loop is performed from blocks 302 to 314 for each measured position record i in the user records 50 that has not yet been subject to filtering to add location description information 86 to the measured position record 64 if such data was not provided by the PIM client 20. If (at block 304) the measured position record i does not include any location description 86 data, then a determination is made (at block 306) as to whether the position coordinate 84 data in record i is within the geographic boundary of any user defined location records 56 of the user being considered. If so, then the location description 94 for the user defined location record 90 is added (at block 308) to the location description 86 data for the measured position record 64. If (at block 306) a geographic boundary was not located in the user defined location records 56, then a determination is made (at block 310) whether the position coordinate 84 data in record i is within the geographic boundary of any public location records 58. If so, then the location description 94 for the public location record 58 is added (at block 312) to the location description 86 data for the measured position record 64. From the yes branch of block 304 (if there is already location information added by the PIM client 20) or from blocks 308 or 312, control proceeds to block 314 to consider all the measured position records 54 for the user. The related application entitled "Method, System, and Program for Providing User Location Information for a Personal Information Management System", having U.S. patent application Ser. No. 09/848,173, which is incorporated by reference in its entirety above, provides additional implementations for obtaining location description information from the user records for other entities and persons in the PIM database 22.

After the measured position records 64 are supplemented with location information from user defined 56 or public 58 location records, then control proceeds to blocks 316 to generate the filtered position records 60 that are particularly suited for use in a PIM or calendaring program. At block 316, the filter scans from the first user position record 54 to determine ranges of consecutive position records 54 having the same location description 86 spanning a time period exceeding a minimum time period. Thus, the filter is looking for position records indicating that the user was at a same location for a minimum time. The minimum time may be a time period of sufficient length that would be meaningful to display in a PIM interface, such as a calendar or schedule, e.g., 10 minutes, etc. For each determined range of records, a filtered position record 60 is generated (at block 318) having a date 100 and time 102 ranges from the date and time of the first to last position records in the determined range and having a location description 106 that is the common location description 86 found in the position records 54 in the determined range. In this way, a single filter position record 50 is generated that defines a location position that was maintained for a minimum time.

At block 320, activity algorithms may then be applied to those position records not consolidated into filtered position records 58 at block 316 and 318. An activity algorithm would analyze a series of consecutive measured position records and based on a rate of change in distance per unit of time, determine a predefined activity associated with the position records. For instance, a range of consecutive measured position records 54 whose position coordinate 84 (x, y, z) is rapidly changing may indicate that the user is traveling in an automobile or other transportation vehicle. Other rate of changes may indicate other activities, e.g., walking, running, bicycle riding, etc. For each determined range of measured position records 54 that define an activity, a filtered position record 60 is generated (at block 322) having a date 100 and time 102 ranges from the date 80 and time 82 of the first and last measured position records 54 in the range and an activity description field 106 set to the activity determined for the range. The geographic location field 104 may comprise a range of first and last locations for the activity, wherein the first location would comprise the location 84 data from the first measured position record 64 in the range for the activity and the last location would comprise the location data 84 from the last record 84 in the range. Thus, in certain described implementations, a filtered position record 60 indicates a time period during which a user was at a location, defined by a geographic boundary or a time period during which the user was engaged in an activity involving movement from one location to another.

The filtered position records 60 are then stored (at block 324) in the PIM database 22 for later use. The filtered position records 60 provide more useful descriptive information than the measured position records 54 because they indicate time periods spent at meaningful geographic locations or engagement in a particular activity.

FIG. 7 illustrates logic implemented in the PIM server 24 to generate calendar information that can be displayed at the wireless device 2 or some other computer in communication with the server 4, such as a desktop computer accessing the server 4 over the Internet. Control begins at block 350 with a request for PIM information for a time interval for a user. In response, the PIM server 24 queries the PIM database 22 for filtered position records 60 (at block 354) and scheduled event records 52 (at block 356) of the user within the specified time interval. The PIM server 24 then generates (at block 358) for each calendar time period, e.g., every half-hour, hour, etc., information on the scheduled event description 74 and the location/activity description 106 (FIGS. 3a, d) in the located scheduled event 52 and filtered position 58 records, respectively, that fall within the calendar time periods that span the specified time interval.

If (at block 360) the viewer program requesting the calendar information for the time period is a WML browser on a small device, e.g., the wireless device 2, then the PIM server 24 generates (at block 362) one or more WML pages including a presentation of the information generated for each calendar time period in the user specified time interval including information on user scheduled events and actual location/activity. Otherwise, if the viewer or browser requesting the calendar information includes a larger display area, then the PIM server 24 generates (at block 364) one or more HTML pages including the presentation of the generated calendar information. From blocks 362 or 364, control transfers to block 366 to transmit the generated web pages to the browser requesting that page. Alternatively, the PIM server 24 may include the generated calendar information in an Extensible Markup Language (XML) or other file that is sent to the PIM client 20 to render on the local display. Thus, the calendar information presented to the user may include a description of user scheduled events as well as information on the geographical locations the user associated with the wireless device 2 visited during the specified time interval.

FIG. 8 illustrates an example of calendar information for the user specified time period presented in a calendar window 400 rendered on a computer display monitor. As shown, the calendar displays both user scheduled events 402 from the scheduled event records and actual location/activity 404 from the filtered position records for calendar times 406 during the specified time interval. In this way, the user may compare what was scheduled with what actually materialized. Moreover, in implementations where the PIM server 24 updates the user calender information in real time and generates real time filtered position records, the calendar 400 could display the user's current geographical location. This information could be useful for business associates and others interested in the user's location. Additionally, the actual location/activity 402 may be displayed in an abbreviated format. The user may use an input device to selectively display further details on the actual location/activity. For instance, the user may move a mouse input device over the displayed abbreviation of the actual location/activity or click the displayed abbreviation to cause the display of more detailed information on the actual location/activity in the calendar window 400.

Figures 9A, 9B:
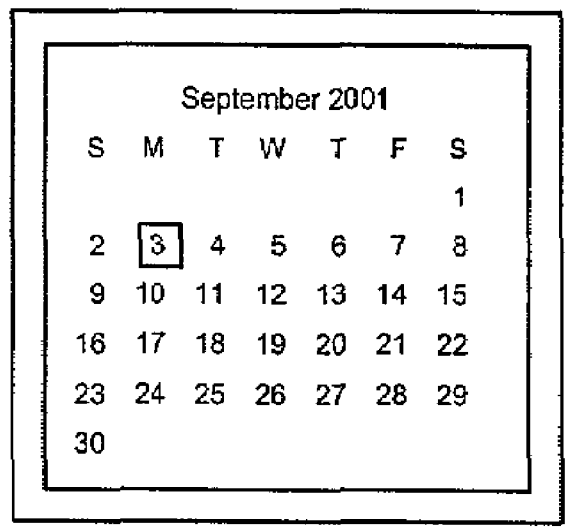

FIGS. 9a, b illustrate how calendar information may be displayed on a display 18 of a wireless device 2 having limited display space. FIG. 9a illustrates a small displayed monthly calendar. Upon user selection through the input mechanism 18 of a particular day, e.g., February 5$^{th}$, the PIM client 20 displays the view shown in FIG. 9b which provides information of scheduled events 450 and actual user location/activity 452 for a portion of the calendar times 454 during the user requested time interval. The user can use the input mechanism 18 to scroll downward to view further calendar entries.

The described implementations provide a technique for gathering and utilizing user position information for use with a PIM or calendaring program. This position information may be provided to the user and those authorized by the user to track actual activity versus scheduled activity.

Providing Information on Proximate Events

Figure 10:
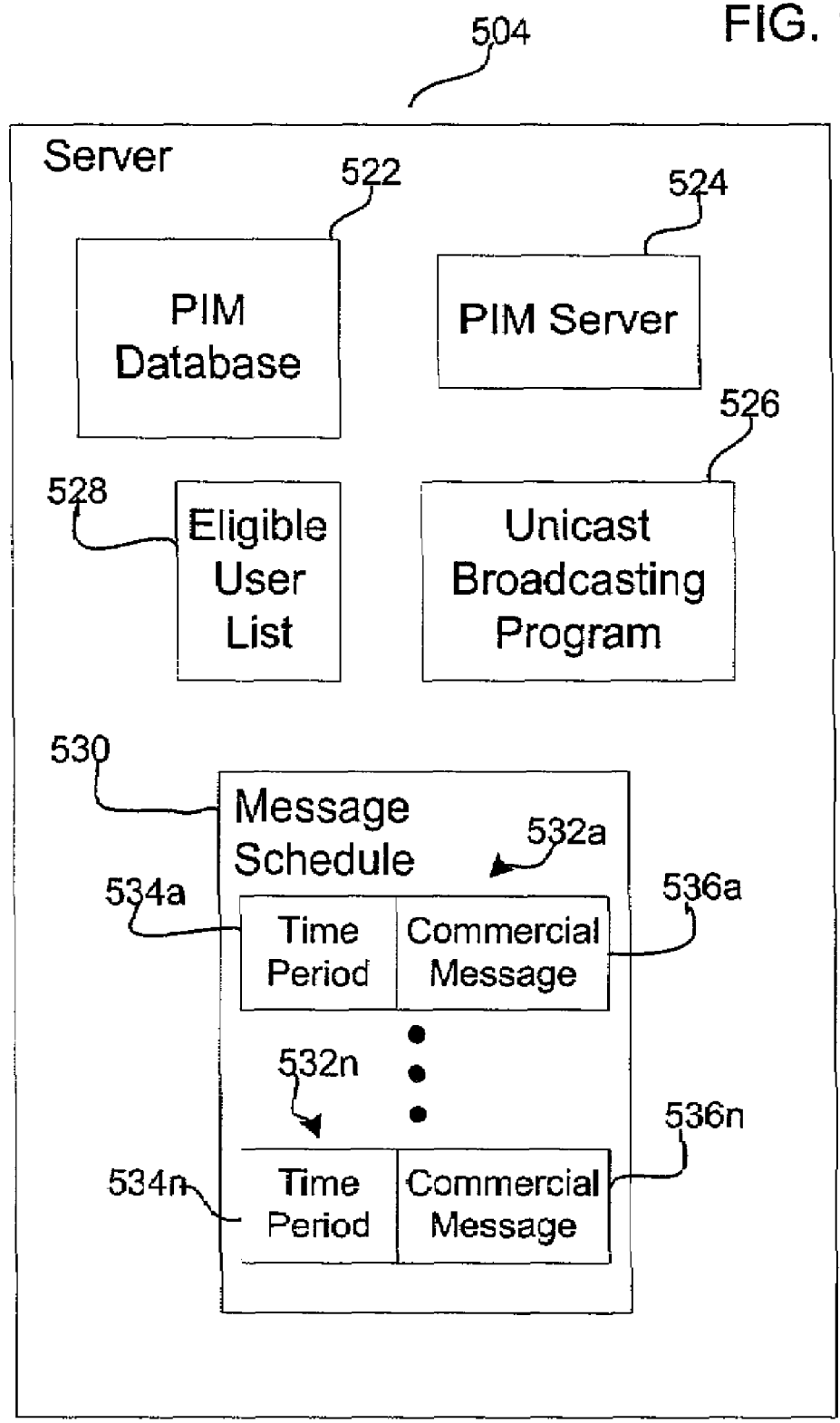
FIG. 10 illustrates components in a server that communicates information to the wireless device in accordance with implementations of the present invention.

In additional implementations, a commercial entity may want to broadcast advertisement on goods and services the commercial entity offers to PIM database 22 users within a proximity to a retail outlet of the commercial entity. In the implementation shown in FIG. 10, a server 504 includes a PIM database 522 and PIM server 524, such as the server components described with respect to the server 4 in FIG. 1, and further includes a unicast broadcasting program 526 and an eligible user list 528 (FIG. 10). The eligible user list 528 may comprise the unique identifier of all the PIM database 22 users that have elected to receive advertisements, all users of the PIM database 22, or all users that satisfy a certain criteria. A message schedule 530 is provided for each commercial entity submitting unicast broadcasts. The message schedule includes a plurality of message records 532a . . . n, each including a time period 534a . . . n and commercial message 536a . . . n, such that the commercial message 536a . . . n is intended for transmittal at the particular time period to tailor the message for the offering for the particular time period, if necessary. For instance, if the commercial entity comprises a restaurant, then the restaurant may want to broadcast information on different menu items for different time periods, e.g., breakfast selections for a time period from 7:00AM to 10:00AM, lunch selections for a time period from 11:30AM to 2:00PM, dinner selections from 5:00PM to 8:00PM, etc.

In further implementations, the user records 50 (FIG. 2) may include personal preference information, such as food preferences (vegetarian, kosher, Italian, Mexican, etc.), marital status, disability, etc. In such implementations, the eligible user list 528 may comprise those PIM database 522 users whose personal preferences satisfy a certain personal preference criteria that can be accommodated by the commercial entity sending the advertisement broadcasts.

Figure 11:
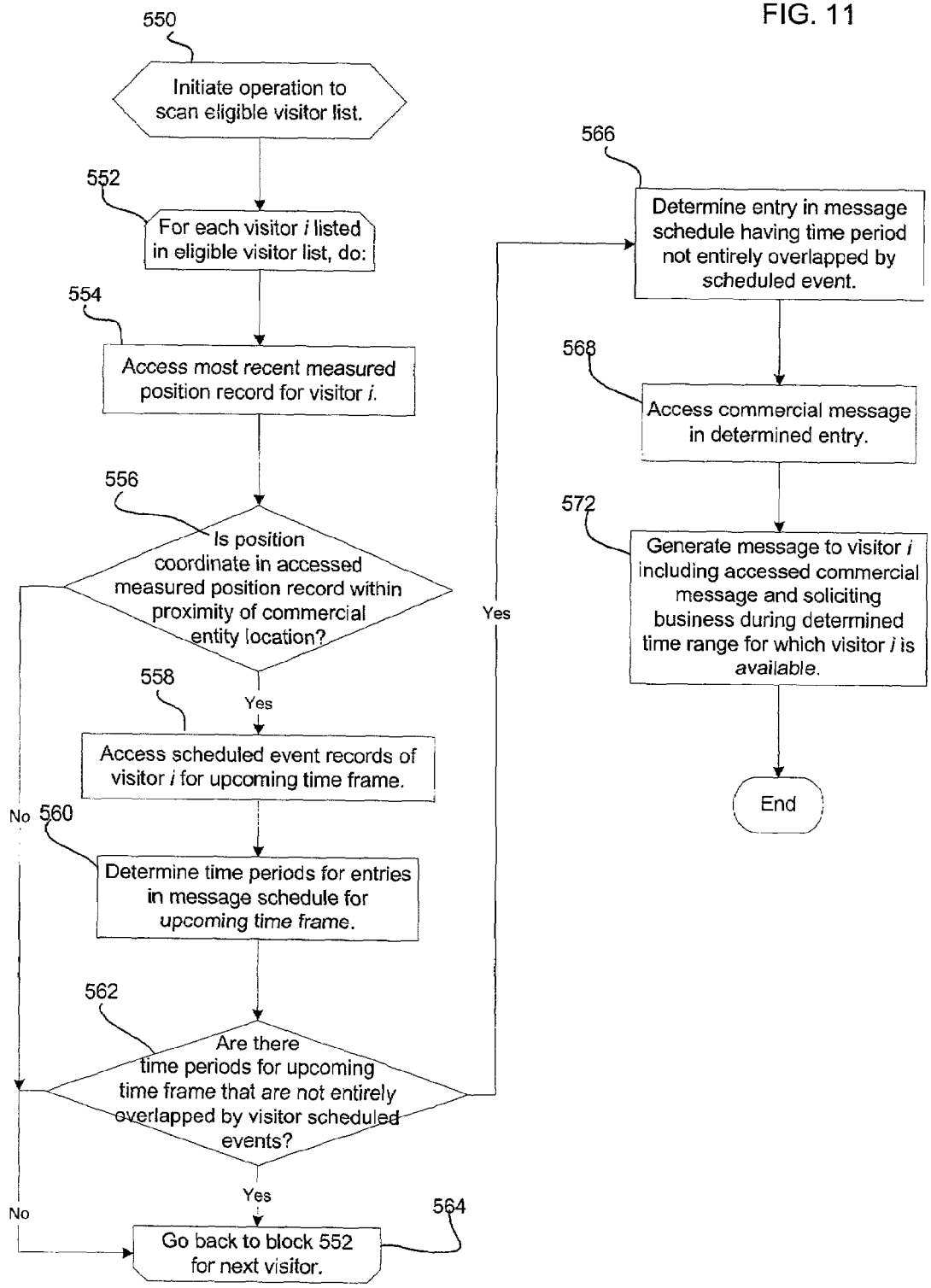
FIG. 11 illustrates logic implemented in the server of FIG. 10 to generate messages to transmit to the wireless device in accordance with implementations of the present invention.

FIG. 11 illustrates logic implemented in the unicast broadcasting program 526 to notify wireless device 2 users of a solicitation by a commercial entity based on user location information. Control begins at block 550 upon initiating an operation to scan the eligible user list 528. For each user i determined to be eligible from the eligible user list 528, a loop is performed at blocks 552 through 564. At block 554, the most recent measured position record 54 (FIG. 3b) for user i is accessed. If (at block 556) the position coordinate 84 from the accessed record 54 is within a predetermined proximity of the commercial entity location, then the scheduled event records 52 (FIG. 3a) of user i are accessed (at block 558) for an upcoming time frame from the current time, e.g., next three hours. Further determined (at block 560) are time periods 534a . . . n in entries 532a . . . n (FIG. 10) of the message schedule 530 within the upcoming time frame. If (at block 562) there are message schedule 530 time periods 534a . . . n that do not entirely overlap with time periods 72 in the determined scheduled event records 52 (FIG. 3a) for the upcoming time frame, then the unicast broadcasting program 526 determines (at block 566) entries 532a . . . n in the message schedule 530 having time periods 534a . . . n during the time frame that do not entirely overlap with user scheduled events. The commercial message 536a . . . n for the determined entry 532a . . . n is then accessed (at block 568). A message is then generated (at block 572) including the accessed commercial message alerting the user of the commercial entity goods or services available for the time period 534a . . . n specified in the message schedule 530. This message is then transmitted to the user wireless device 2 (FIG. 1).

If (at block 556) the position coordinate of the user's wireless device 2 is not within a predefined proximity to the commercial entity or the user has scheduled events for the entire upcoming time frame (at block 560), then control proceeds (at block 564) to consider the next user on the eligible user list 528.

With the logic of FIG. 11, a commercial entity may broadcast targeted messages specific to a particular time period to wireless device 2 users that are within a predefined proximity to the commercial entity and who have no scheduled calendar events for the upcoming time frame. For instance, a restaurant would check whether the user has scheduled events for the entire lunch or dinner time period while the wireless device 2 is within the predefined proximity to the restaurant in order to transmit lunch or dinner specials to the wireless device. In this way, a commercial entity may target advertising based both on a user's proximity to the commercial entity and the availability of the user at specific offering times.

Figure 12:
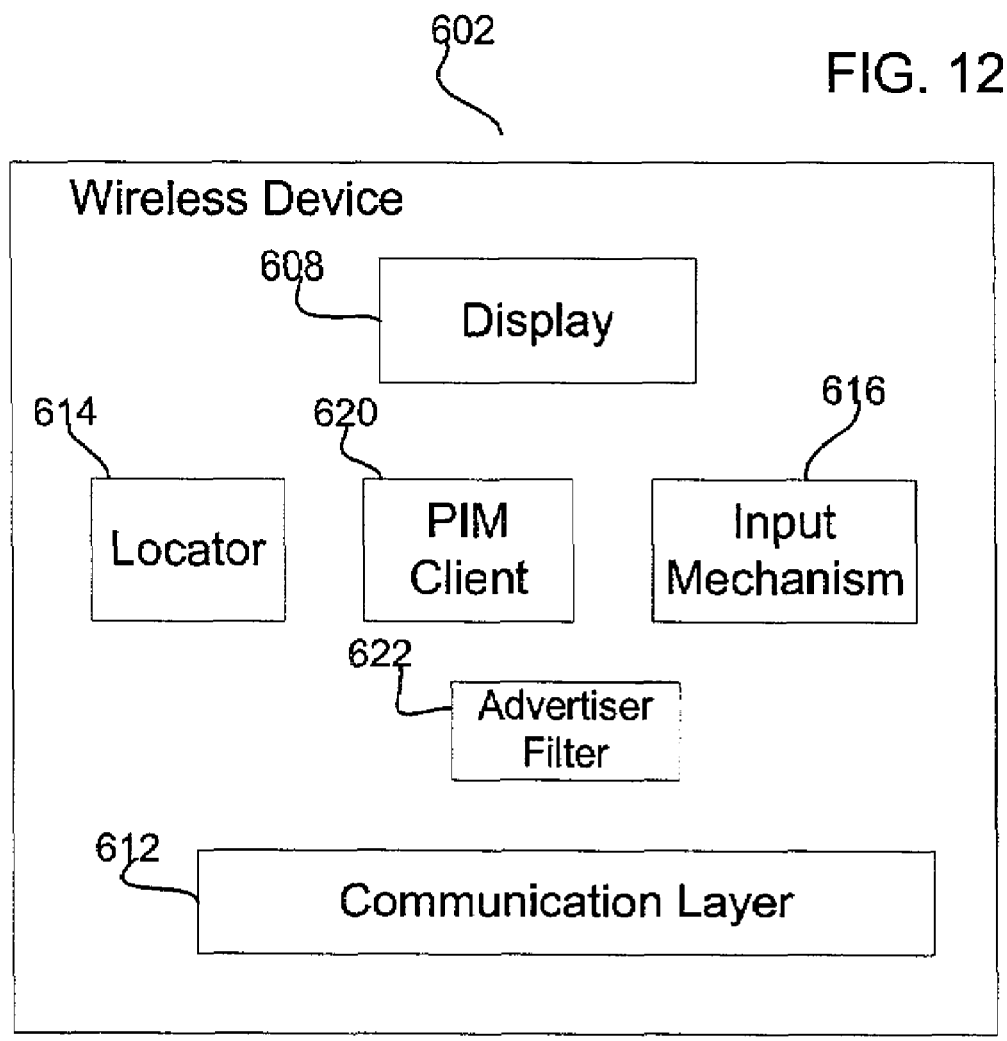
FIG. 12 illustrates components within a wireless device in accordance with implementations of the present invention.
Figure 13:
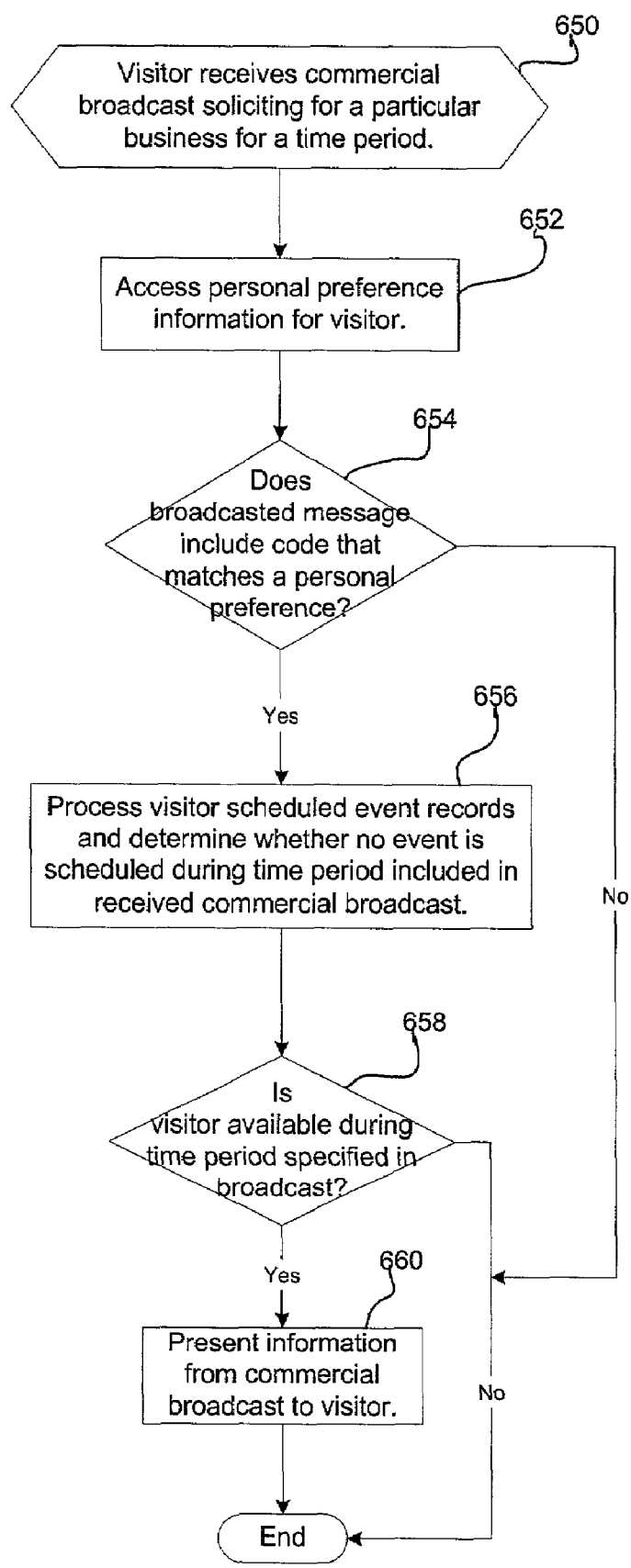
FIG. 13 illustrates logic implemented in the wireless device to provide information to the user of the wireless device in accordance with implementations of the present invention.

In an additional implementation, the commercial entity may make a general broadcast and the wireless device 602 shown in FIG. 12, which has many of the same components of the wireless device 2 in FIG. 1, including a display 608, locator 614, PIM client 620, input mechanism 616, and communication layer 612. The wireless device 602 in FIG. 12 further includes an advertiser filter 622 to determine whether to present the broadcasted message to the user. FIG. 13 illustrates logic implemented in the wireless device 602 advertiser filter 622 to determine whether to allow a multicasted commercial message to be presented to the user of the wireless device 602. Control begins at block 650 upon receiving a commercial broadcast solicitation for a particular commercial entity, or non-commercial entity, for a time period. The advertiser filter 622 would then access (at block 652) user personal preference information maintained locally in the wireless device 602 or maintained in the user records 60 in the PIM database 22. If (at block 654) the broadcasted message includes code or terms that match a user defined personal preference, then the advertiser filter 622 processes (at block 656) user scheduled event records 62 (FIG. 3a) to determine whether no scheduled event entirely overlaps the time period included in the transmitted period of the duration during which the described services are offered. If (at block 658) the user is available during a time period specified in the commercial message, then the advertiser filter 622 presents (at block 660) the message to the user via the display 608.

With the implementation of FIGS. 12 and 13, the advertiser filter 622 considers whether a transmitted message offering goods and services for a time period satisfies certain user personal preferences and specifies a time period during which the user is available, i.e., not busy as indicated in the scheduled event records 52 (FIG. 3a). Further, the broadcast may only be received by wireless devices 2 (FIG. 1) within a certain proximity to the transmitter, thereby ensuring that the user is within a reasonable proximity to the commercial entity offering the goods and services.

Figure 14:
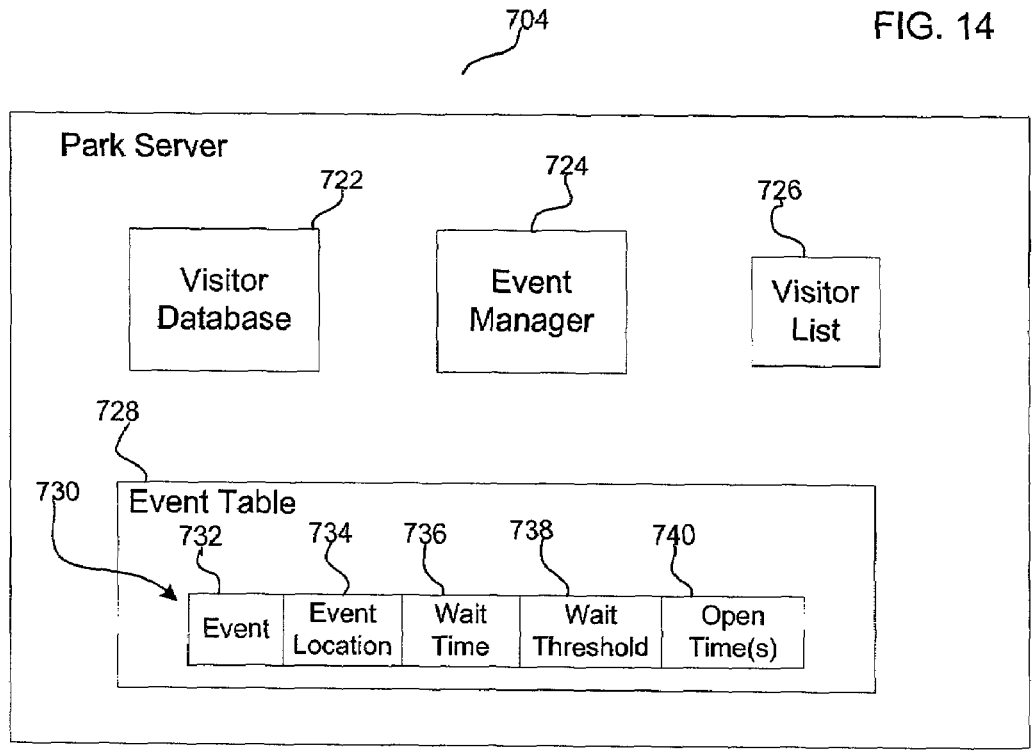
FIG. 14 illustrates components within a park server used by an entity such as an amusement park in accordance with implementations of the present invention.

In a still further implementation, an amusement park may transmit to park visitors having the wireless device 2 information on the availability of events of interest that are within a close proximity to the visitor. The amusement park may provide visitors a park owned wireless device 2 (FIG. 1) or the visitor may use their own wireless device 2. FIG. 14 illustrates an implementation of a park server 704 which includes the communication capabilities of the server 4 (FIG. 1) to communicate with wireless devices 2. The park server 704 further includes a visitor database 722, an event manager 724 program, and a visitor list 726 of all current visitors in the park having a wireless device 2, whether assigned by the park or provided by the visitor. The visitor database 722 would maintain records similar to those found in the PIM database 22. The visitor database 722 would include at least one measured position record 54 (FIG. 3b) for each visitor on the list 726 indicating the visitor's current position in the park. Additionally, the visitor database 722 could maintain filtered position records 60 (FIG. 3d) generated from multiple position records 54 collected for visitors to develop a view of the time visitors spent at different locations in the park.

The park server 722 may also maintain an event table 728 including an event record 730 for each event at the park. Each event record 730 includes:

Event 732: identifies a particular event, ride, show, etc.

Event Location 734: specifies the geographic boundary of the event within the park.

Wait Time 736: a real-time estimated wait time for the event. Can be determined by the number of users within the bounds of the event location 734.

Wait Threshold 738: a maximum threshold wait time. If the wait time 736 exceeds the wait threshold 738, then the event manager 724 will not route visitors to the event.

Open Time(s) 740: Indicates the hours the event is open to the public. For a ride or continuous presentation, there would be one open time range, e.g., 9:00AM to 6:00PM. However, for shows, there may be multiple discrete start times.

Figure 15:
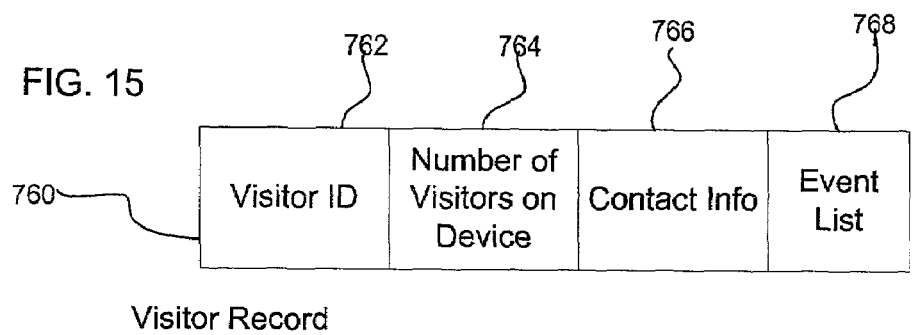
FIG. 15 illustrates a visitor record generated by the park server of FIG. 14 in accordance with implementations of the present invention.

FIG. 15 illustrates a format of a user record 760 maintained in the visitor database 722 that may be gathered for each visitor or group of visitors using a wireless device. The visitor record 760 includes a unique identifier 762 for a visitor, which may identify a visitor membership record, the number of visitors 764 utilizing the wireless device, contact information 766, and an event list 768 of the events the visitor wants to attend.

Figure 16:
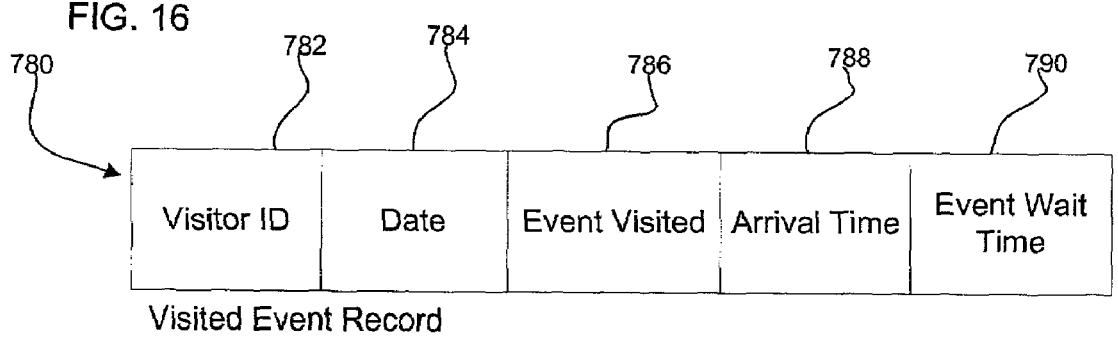
FIG. 16 illustrates a visited event record generated by the park server of FIG. 14 in accordance with implementations of the present invention.

FIG. 16 illustrates a format of a visited event record 780 that the event manager 724 program generates and stores in the visitor database 722 to collect information on visitor attendance at different park events. The visited event record 780 includes a visitor identifier 782 identifying the visitor for which the record was generate, a date 784 the record was generated, the event visited 786, an arrival time 788 at the event, and the wait time 790 for the event. The event manager 724 would gather visited event records 780 for use in data mining to analyze the waiting time for events, event usage, event usage at different times of the day, etc.

Figure 17:
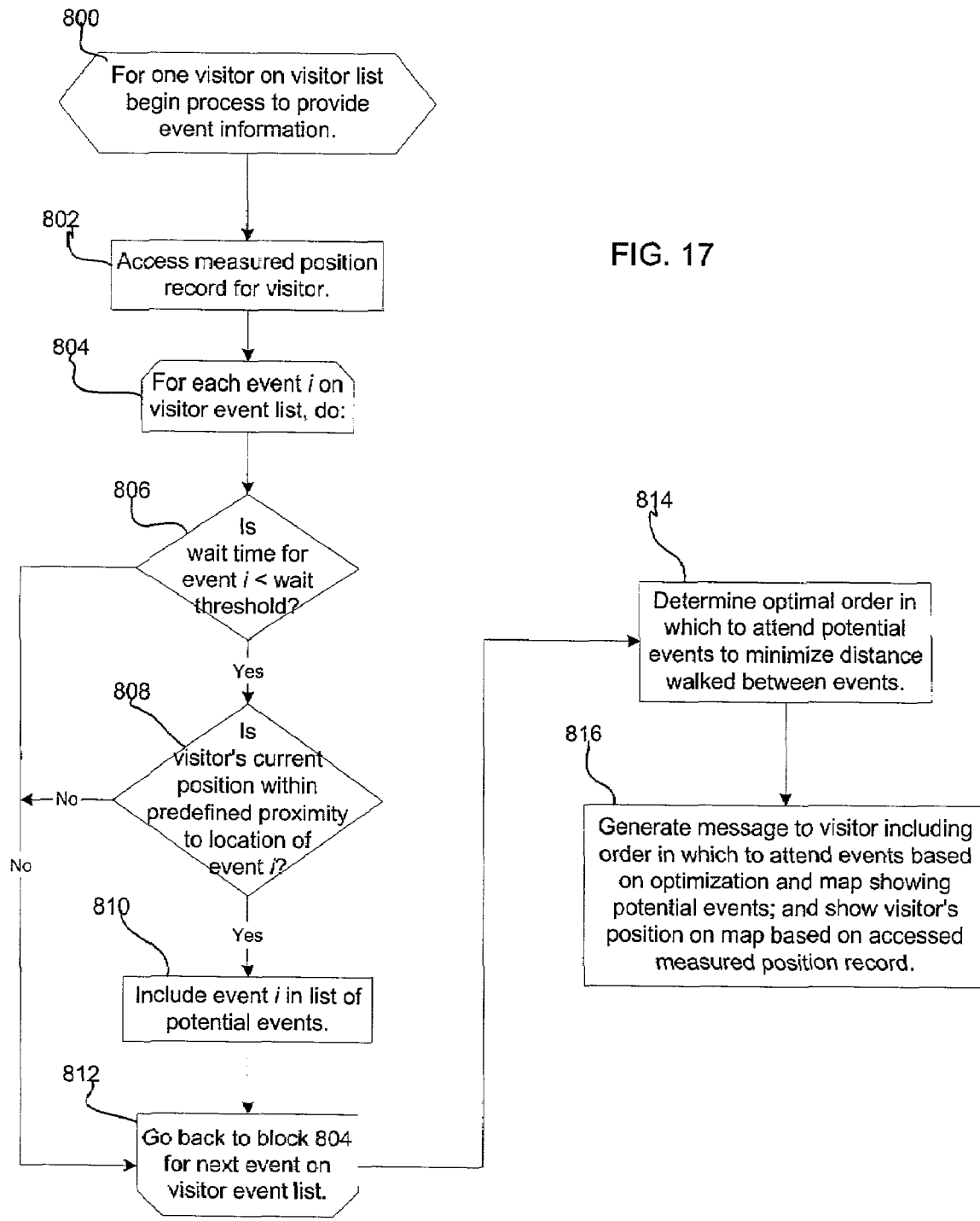
FIG. 17 illustrates logic implemented in the park server to provide information on park events to wireless device users in accordance with implementations of the present invention.

FIG. 17 illustrates logic implemented in the event manager 724 to generate and present event information to park visitors having a wireless device 2 (FIG. 1). In one implementation, the event manager 726 may periodically process the visitor list 726 and at block 800 in FIG. 17 begin the process to provide event information to one user. At block 802, the event manager 726 accesses the most recent measured position record 54 (FIG. 3b) indicating the current position coordinate 84 of the visitor, as the measured position record data may be gathered frequently. For each event i on the event list 768 (FIG. 15) of the visitor record 760 for the considered visitor, a loop is performed at blocks 804 through 812. If(at block 806) the wait time 790 for event i, as indicated in the event record 730 for event i in the event table 728 (FIG. 14), does not exceed the wait threshold 738 for event i and if(at block 808) the visitor's current location as indicated by the position coordinate 84 of the accessed measured position record 54 (FIG. 3b) is within a predefined proximity to the event location 734, then event i is included (at block 810) in the list of potential events.

After all the potential events the visitor may attend are determined following block 812, the event manager 724 determines (at block 814) the optimal order in which to attend potential events in a manner that minimizes the distance walked between events from the visitor's current location as indicated in the accessed measured position record. The determination of the optimal order may be made using an optimization techniques for minimizing distance traveled known in the art, such as the traveling salesman algorithm. The event manager 724 would then generate and send (at block 816) a message to the visitor wireless device 2 (FIG. 1) including the determined optimal order to attend events on the visitor's event list 768. The message may include a map showing the events numbered according to the optimal order as well as the visitor's current location as based on the position coordinate 84 in the measured position record 54 (FIG. 3b) for the visitor.

Figure 18:
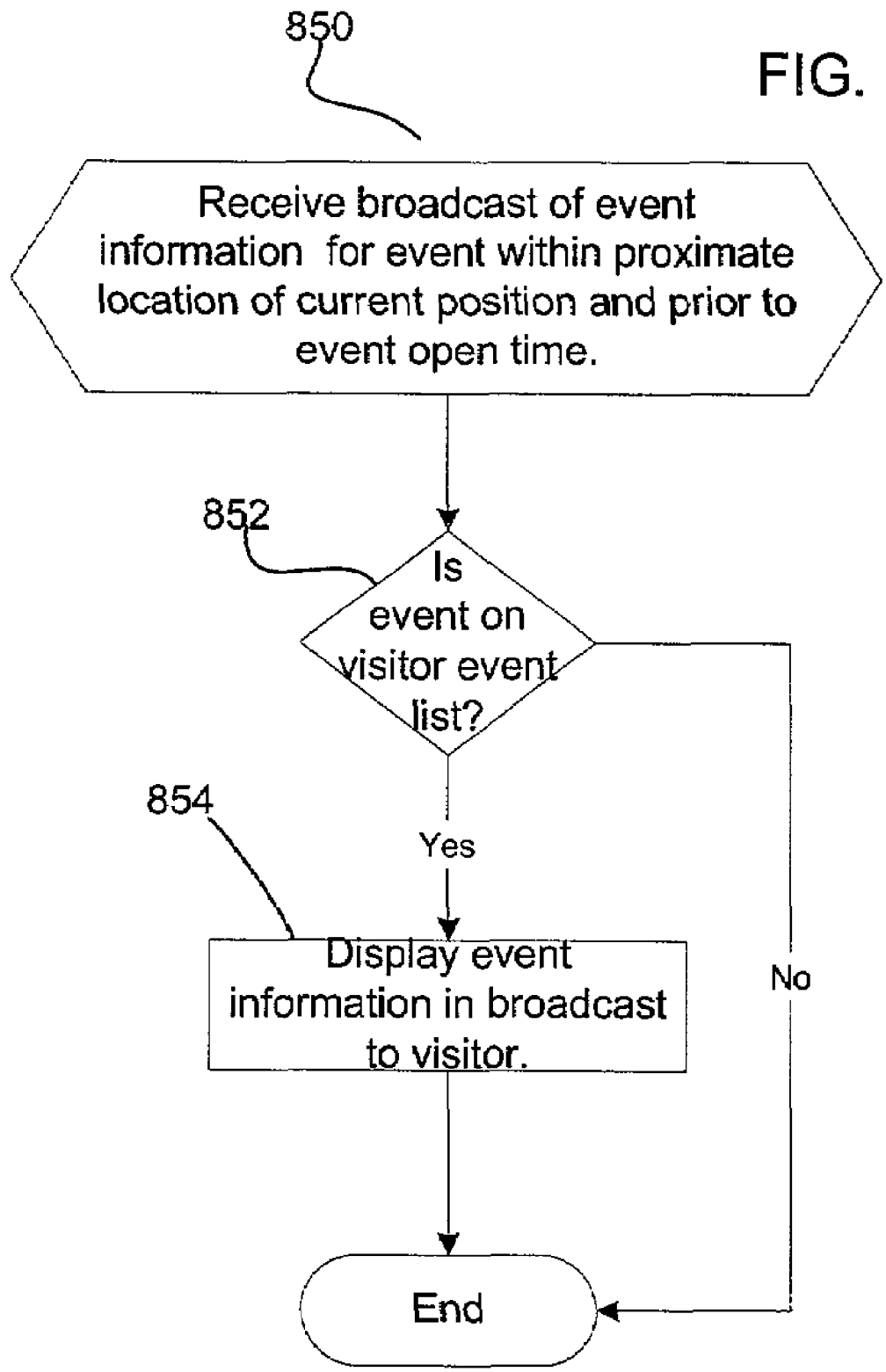
FIG. 18 illustrates logic implemented in the wireless device to process event information received from the park server in accordance with implementations of the present invention.

FIG. 18 illustrates logic implemented in a filter within the wireless device 2 to determine whether to display an event message on the wireless device display 18 or otherwise alert the visitor of the event message. Control begins at block 850 upon receiving an event transmission. If (at block 852) the event is on the user event list 768, then the event information would be displayed (at block 854) on the visitor wireless device 2 display 18 (FIG. 1).

Figure 19:
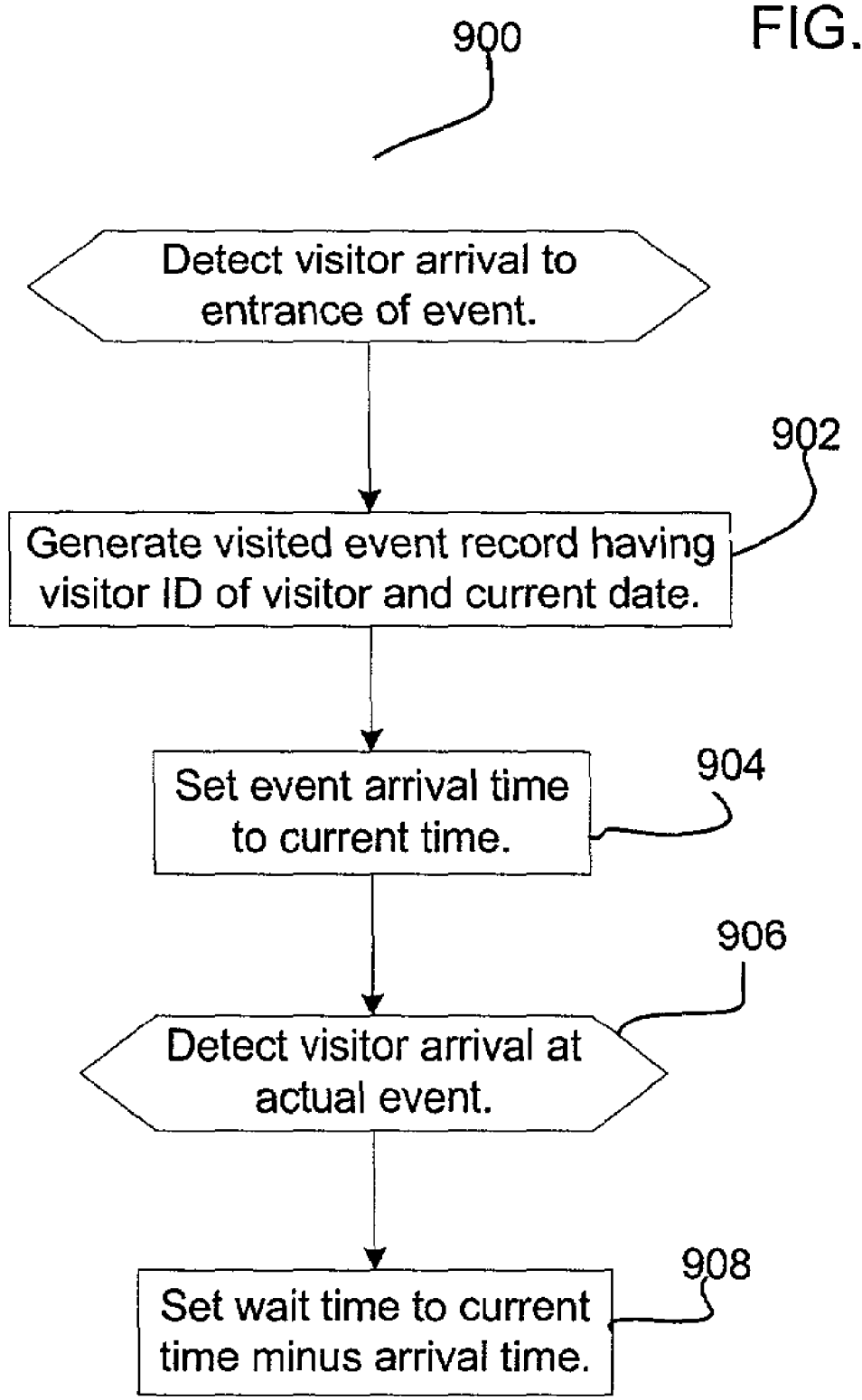
FIG. 19 illustrates logic implemented in the park server of FIG. 14 to generate the visited event records of FIG. 16 in accordance with implementations of the present invention.

FIG. 19 illustrates logic implemented in the event manager 724 to generate visited event records 780 (FIG. 16) which provide information on the events visited. Control begins at block 900 upon detecting the visitor's entrance to one event by communicating with visitor wireless device 2 within the event boundary. The event manager 724 then generates (at block 902) a visited event record 780 (FIG. 16) having the visitor ID and current date 784. The event arrival time 788 is added (at block 904) to the generated record 780. Upon detecting (at block 906) the visitor's arrival at the geographic boundary of the actual event, e.g., ride, start of play, etc., the wait time 790 (FIG. 16) is calculated (at block 908) by subtracting the arrival time 788 from the current time. In this way, the event manager 724 can gather information on visitor presence at particular events 786 at different time periods within a day, including information on the wait time.

With the logic of FIGS. 11, 13, 17, and 18, the server pushes event information to a specific user wireless device. In additional implementations, the wireless device 2 may pull information from the server in response to an action the user takes at the wireless device. For instance, with respect to FIGS. 17 and 18, if the visitor wants to know events on their event list 768 proximate to the current location, the visitor may query the park server 704 for such information, which would then execute the logic of FIG. 14 to generate and provide such information to the visitor wireless device.

In the logic of FIGS. 11 and 17, the server unicasts event information to specific visitor wireless devices 2. In additional implementations, information on proximate events may be multicasted to numerous visitor wireless devices 2, such as the case with the logic of FIGS. 13 and 18. This unicast broadcast may be made to all wireless devices 2 within a proximate distance of the target location an event, such as a Bluetooth transmission.

The above described implementations allow an entity to provide event and other commercial related information to wireless device users within a proximate distance from the situs of the event to solicit business or direct the wireless device users to different activities based on the current location of the wireless device and any other parameters, such as user preferences, etc.

Additional Implementation Details

The described aspects of the invention, including the logic described with respect to the PIM client and server and any other devices, may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which the invention is implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the wireless device obtains the position coordinates and time and date information and transmits the data to the server 4. In alternative implementations, telecommunication devices or towers can detect the location of the wireless device and transmit the data for the measured position record 54 directly to the server 4. In such implementations, the wireless device would not be involved in transmitting position coordinates for the measured position records.

The described implementations concerned maintaining user location information with a user calendar program. The described implementations can further be used to provide and utilize a persons geographic location and/or activities for a measured time period for any purpose, not just calendering. For instance, a company may want to track the location and activity of workers. The company can then filter and compare a workers actual location/activity with their work schedule. Such information would be particularly useful for manufacturers and others attempting to determine optimal human resource allocation in the workplace.

The PIM location/activity information of the described implementations would also be very useful for companies that have to send workers out to field locations, such as cable companies, telephone companies, plumbers, etc., to track how the worker's actual location/activities correspond to those scheduled. In the case that real time worker location/activity information is provided to the calendar display, then the company can track the workers schedule and their actual geographic location in real time. Moreover, because descriptive geographic information is provided, a quick review of the calendar information can provide useful information on the workers geographic location, such as their presence in a particular building. Moreover, to the extent location records define the geographic boundaries of major roadways and freeways, a manager could review a field workers real time calendar, which could display that the worker is presently driving on a roadway. The activity algorithm can specify the rate the worker is traveling, i.e., indicating stuck in traffic, etc.

In the described implementations, scheduled events and location/activity information were displayed together in a user calendar view. Alternatively, the calendar view may selectively display only scheduled events or location/activity information.

The described implementations presented the scheduled event and location/activity information at different times during a user specified time interval. However, the generated location/activity information may be presented in alternative formats. For instance, the user may generate a display of all locations visited and activities, and the time period during which the location was visited or activity performed would be displayed under the location/activity display.

FIGS. 3a, b, c, d illustrate one implementation of the data structures used to maintain the information used in the described implementations. However, those skilled in the art will recognize that the there are numerous ways the data shown in FIGS. 3a, b, c, d may be organized in data structures and a database for storage and retrieval.

In the described implementations, the PIM server 24 transmitted the PIM information to the client PIM 20 or some other client to display in a browser, such as a WML or HTML browser. In alternative implementations, the PIM server 24 may provide the generated PIM information in alternative presentation and file formats, or alternative text markup languages than those described herein. Moreover, the location information presented to the user through the browser may present information in alternative presentation formats, such as audio, movies, etc. For instance, the calendar may display a hypertext description of the visited location. User selection of the hypertext description could present a movie or audio file about the visited location.

Still further, the user, through the wireless device 2 or some other computer may provide images or audio files taken from a location to associate with measured position records. In certain implementations, the wireless device 2 could include a microphone, still image camera, video camera etc. The user could then associate such multi-media files image information with the location that the PIM client 20 would provide with the measured position records 54 sent to the PIM server 24. This information would be made available to those viewing the calendar providing the location/activity information.

In the described implementation, the generated location was expressed as an x, y, z position coordinate. However, as discussed, the position coordinate may be expressed as any set of numbers used in specifying a location in space, or may comprise a code or descriptor defining a location in space.

In the described implementations, advertising messages were transmitted by a commercial entity. However, non-commercial entities may transmit messages soliciting certain services or goods offered by the non-commercial entity.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for transmitting information to a wireless device comprising:
   determining a current location of the wireless device;
   determining whether the current location is within a proximity to a target location;
   accessing scheduled event records for a user of the wireless device in response to determining tat the current location is within the proximity to the target location wherein each scheduled event record indicates one event scheduled for a calendar time period;
   processing the scheduled event records for the user to determine whether the user is available to visit the target location; and
   if the current location is within the proximity to the target location and the user is available to visit the target location, then transmitting information to the wireless device on offerings available at the target location.

2. The method of claim 1, wherein the scheduled event records are part of calendar information for the user.

3. The method of claim 1, further comprising:
   providing a data structure indicating a plurality of time periods during which offerings are available at the target location; and
   determining whether the user is available to visit the target location within one of the time periods indicated in the data structure, wherein the information is not transmitted if the user is not determined to be available to visit the target location during one of the time periods indicated in the data structure.

4. The method of claim 3, wherein the data structure further includes information for each time period on offerings available at the target location during the time period wherein transmitting the information to the wireless device comprises transmitting the information indicated in the data structure for one time period during which the user of the wireless device is determined to be available to visit the target location.

5. The method of claim 1, wherein the offerings available at the target location comprise at least one of goods and services.

6. The method of claim 1, further comprising:
   accessing information indicating personal preferences of a user of the wireless device; and
   determining whether the offerings at the target location match at least one personal preference indicated by the user, wherein the information is transmitted if the offerings at the target location match one personal preference indicated by the user.

7. The method of claim 1, wherein the determining and transmitting operations are performed in response to a push action.

8. The method of claim 1, wherein the determining and transmitting operations are performed in response to a pull action at the wireless device.

9. A method for transmitting information to a wireless device comprising:
   determining a current location of the wireless device;
   providing a data structure including event information for each of a plurality of events that occur at event locations;
   determining whether the current location is within a proximity to at least one of the event locations;
   accessing scheduled event records for a user of the wireless device in response to determining that the current location is within the proximity to the target location, wherein each scheduled event record indicates one event scheduled for a calender time period;
   processing the scheduled event records for the user to determine whether the user is available to visit the target location; and
   if the current location is within the proximity to at least one event location and the user is available to visit the target location, then transmitting event information to the wireless device for the at least one event location that is within the proximity to the wireless device.

10. The method of claim 1, wherein the target location comprises an activity at an amusement park.

11. The method of claim 9, further comprising:
   accessing event preference information provided by the user of the wireless device indicating events the user selected, wherein determining whether the current location is within the proximity to at least one event location further comprises determining whether the event at the event location within the proximity to the current location is indicated in the event preference information, and wherein the transmitted information is for at least one event indicated in the event preference information.

12. The method of claim 9, further comprising:
determining, for all the determined events at event locations within the proximity to the current location, an optimal order in which the events should be visited based on the event locations and the current location; and
generating information indicating the optimal order in which the events at the event locations should be visited, wherein the generated information is transmitted to the wireless device.

13. The method of claim 9, further comprising:
determining a wait time at each event whose event location is within the proximity to the current location; and
determining whether the wait time for each event exceeds a wait threshold, wherein the event information is not sent for each event having the wait time that exceeds the wait threshold.

14. The method of claim 9, further comprising:
for each wireless device, gathering data on event locations where the wireless device was located and a lime the wireless device was located at the event location.

15. A method for processing information at a wireless device, comprising:
receiving information broadcasted within a defined region on event offerings at a target location within a proximity to the wireless device for an event time period;
accessing scheduled event records for a user of the wireless device in response to receiving the information broadcasted, wherein each scheduled event record indicates one event scheduled for a calendar time period;
processing the scheduled event records for the user to determine whether the user is available during the event time period; and
presenting the information on the event offerings to the user if the user is determined to be available during the event time period.

16. The method of claim 15, further comprising:
providing information on user preferences; and
determining whether the received information satisfies one user preference, wherein the information is not presented to the user if the received information does not satisfy one user preference.

17. A system for transmitting information to a wireless device comprising:
means for determining a current location of the wireless device;
means for determining whether the current location is within a proximity to a target location; and
means for accessing scheduled event records for a user of the wireless device in response to determining that the current location is within the proximity to the target location, wherein each scheduled event record indicates one event scheduled for a calendar time period;
means for processing the scheduled event records for the user to determine whether the user is available to visit the target location; and
means for transmitting information to the wireless device on offerings available at the target location if the current location is within the proximity to the target location and the user is available to visit the target location.

18. The system of claim 17, wherein the scheduled event records are part of calendar information for the user.

19. The system of claim 17, further comprising:
a computer readable medium;
means for providing a data structure in the computer readable medium indicating a plurality of time periods during which offerings are available at the target location; and
means for determining whether the user is available to visit the target location within one of the time periods indicated in the data structure, wherein the information is not transmitted if the user is not determined to be available to visit the target location during one of the time periods indicated in the data structure.

20. The system of claim 19, wherein the data structure further includes information for each time period on offerings available at the target location during the time period, wherein the means for transmitting the information to the wireless device transmits the information indicated in the data structure for one time period during which the user of the wireless device is determined to be available to visit the target location.

21. The system of claim 17, wherein the offerings available at the target locations comprise at least one of goods and services.

22. The system of claim 17, further comprising:
means for accessing information indicating personal preferences of the user of the wireless device; and
means for determining whether the offerings at the target location match at least one personal preference indicated by the user, wherein the information is transmitted if the offerings at the target location match one personal preference indicated by the user.

23. The system of claim 17, wherein the operations are performed in response to a push action.

24. The system of claim 17, wherein the operations are performed in response to a pull action at the wireless device.

25. The system of claim 17, wherein the target location comprises an activity at an amusement park.

26. A system for transmitting information to a wireless device comprising:
a computer readable medium;
means for determining a current location of the wireless device;
means for providing a data structure in the computer readable medium including event information for each of a plurality of events that occur at event locations;
means for determining whether the current location is within a proximity to at least one of the event locations;
means for accessing scheduled event records for a user of the wireless device in response to determining that the current location is within the proximity to the target location, wherein each scheduled event record indicates one event scheduled for a calendar time period;
means for processing the scheduled event records for the user to determine whether the user is available to visit the target location; and
means for transmitting event information to the wireless device for the at least one event location that is within the proximity to the wireless device if the current location is within the proximity to at least one event location and the user is available to visit the target location.

27. The system of claim 26, further comprising:
means for accessing event preference information provided by the user of the wireless device indicating events the user selected, wherein the means far determining whether the current location is within the proximity to at least one event location determines whether the event at the event location within the proximity to the current location is indicated in the event preference information, and wherein the transmitted information is for at least one event indicated in the event preference information.

28. The system of claim 26, further comprising:
means for determining, for all the determined events at event locations within the proximity to the current location, an optimal order in which the events should be visited based on the event locations and the current location; and
means for generating information indicating the optimal order in which the events at the event locations should be visited, wherein the generated information is transmitted to the wireless device.

29. The system of claim 26, further comprising:
means for determining a wait time at each event whose event location is within the proximity to the current location; and
means for determining whether the wait time for each event exceeds a wait threshold, wherein the event information is not sent for each event having the wait time that exceeds the wait threshold.

30. The system of claim 26, further comprising:
means for gathering, for each wireless device, data on event locations where the wireless device was located and a time the wireless device was located at the event location.

31. A system for processing information at a wireless device, comprising:
means for receiving information broadcasted within a defined region on event offerings at a target location within a proximity to the wireless device for an event time period;
means for accessing scheduled event records for a user of the wireless device in response to receiving the information broadcasted, wherein each scheduled event record indicates one event scheduled for a calendar time period;
means for processing the scheduled event records for the user to determine whether the user is available during the event time period; and
means for presenting the information on the event offerings to the user if the user is determined to be available during the event time period.

32. The system of claim 31, further comprising:
means for providing information on user preferences; and
means for determining whether the received information satisfies one user preference, wherein the information is not presented to the user if the received information does not satisfy one user preference.

33. An article of manufacture including code for transmitting information to a wireless device by:
determining a current location of the wireless device;
determining whether the current location is within a proximity to a target location; and
accessing scheduled event records for a user of the wireless device in response to determining tat the current location is within the proximity to the target location, wherein each scheduled event record indicates one event scheduled for a calendar time period;
processing the scheduled event records for the user to determine whether the user is available to visit the target location;
if the current location is within the proximity to the target location and the user is available to visit the target location, then transmitting information to the wireless device on offerings available at the target location.

34. The article of manufacture of claim 33, wherein the scheduled event records are part of calendar information for the user.

35. The article of manufacture of claim 33, further comprising:
providing a data structure indicating a plurality of time periods during which offerings are available at the target location;
determining whether the user is available to visit the target location within one of the time periods indicated in the data structure, wherein the information is not transmitted if the user is not determined to be available to visit the target location during one of the time periods indicated in the data structure.

36. The article of manufacture of claim 35, wherein the data structure further includes information for each time period on offerings available at the target location during the time period, wherein transmitting the information to the wireless device comprises transmitting the information indicated in the data structure for one time period during which the user of the wireless device is determined to be available to visit the target location.

37. The article of manufacture of claim 33, wherein the offerings available at the target location comprise at least one of goods and services.

38. The article of manufacture of claim 33, further comprising:
accessing information indicating personal preferences of a user of the wireless device; and
determining whether the offerings at the target location match at least one personal preference indicated by the user, wherein the information is transmitted if the offerings at the target location match one personal preference indicated by the user.

39. The article of manufacture of claim 33, wherein the operations are performed in response to a push action.

40. The article of manufacture of claim 33, wherein the operations are performed in response to a pull action at the wireless device.

41. The article of manufacture of claim 33, wherein the target location comprises an activity at an amusement park.

42. An article of manufacture including code for transmitting information to a wireless device by:
determining a current location of the wireless device;
providing a data structure including event information for each of a plurality of events that occur at event locations;
determining whether the current location is within a proximity to at least one of the event locations; and
accessing scheduled event records for a user of the wireless device in response to determining that the current location is within the proximity to the target location, wherein each scheduled event record indicates one event scheduled for a calendar time period;
processing the scheduled event records for the user to determine whether the user is available to visit the target location; and
if the current location is within the proximity to at least one event location and the user is available to visit the target location, then transmitting event information to the wireless device for the at least cue event location that is within the proximity to the wireless device.

43. The article of manufacture of claim 42, further comprising:

accessing event preference information provided by the user of the wireless device indicating events lbs user selected, wherein determining whether the current location is within the proximity to at least one event location further comprises determining whether the event at the event location within the proximity to the current location is indicated in the event preference information, end wherein the transmitted information is for at least one event indicated in the event preference information.

44. The article of manufacture of claim 42, further comprising:

determining, for all the determined events at event locations within the proximity to the current location, an optimal order in which the events should be visited based on the event locations and the current location; and generating information indicating the optimal order in which the events at the event locations should be visited, wherein the generated information is transmitted to the wireless device.

45. The article of manufacture of claim 42, further comprising:

determining a wait time at each event whose event location is within the proximity to the current location; and determining whether the wait time for each event exceeds a wait threshold, wherein the event information is not sent for each event having the wait time that exceeds the wait threshold.

46. The article of manufacture of claim 42, further comprising:

for each wireless device, gathering data on event locations where the wireless device was located and a time the wireless device was located at the event location.

47. An article of manufacture including code for processing information at a wireless device by:

receiving information broadcasted within a defined region on event offerings at a target location within a proximity to the wireless device for an event time period;

accessing scheduled event records for a user of the wireless device in response to receiving the information broadcasted, wherein each scheduled event record indicates one event scheduled for a calendar time period;

processing the scheduled event records for the user to determine whether the user is available during to event time period; and presenting the information on the event offerings to the user if the user is determined to be available during the event time period.

48. The article of manufacture of claim 47, further comprising:

providing intimation on user preferences;

determining whether the received information satisfies one user preference, wherein the information is not presented to the user if the received information does not satisfy one user preference.

* * * * *

UNITED STATES PATENT AND TRADEMARK OFFICE
CERTIFICATE OF CORRECTION

PATENT NO. : 7,085,818 B2
APPLICATION NO. : 09/965007
DATED : August 1, 2006
INVENTOR(S) : Michael Wayne Brown, Rabindranath Dutta and Michael A. Paolini It is certified that error appears in the above-identified patent and that said Letters Patent is hereby corrected as shown below:

Column 17, line 57 Claim 1, delete "tat" and insert -- that -- .

Column 19, line 25 Claim 14, delete "and a lime" and insert -- and a time -- .

Column 20, line 24 Claim 21, delete "locations" and insert -- location -- .
Line 67, delete "far" and insert -- for -- .

Column 21, line 61 Claim 33, delete "tat" and insert -- that -- .

Column 22, line 66 Claim 33, delete "cue" and insert -- one -- .

Column 23, line 4 Claim 43, delete "lbs" and insert -- the -- .
Line 10, delete "end wherein" and insert -- and wherein -- .

Column 24, line 17 Claim 47, delete "to" and insert -- the -- .
Line 24, delete "intimation" and insert -- information -- .

Signed and Sealed this

First Day of May, 2007

JON W. DUDAS
*Director of the United States Patent and Trademark Office*